US010634830B2

(12) United States Patent
Kunugise et al.

(10) Patent No.: US 10,634,830 B2
(45) Date of Patent: Apr. 28, 2020

(54) IMAGING DEVICE, IMAGE PROCESSING METHOD AND PROGRAM FOR IMAGING DEVICE

(71) Applicant: FUJIFILM Corporation, Tokyo (JP)

(72) Inventors: Takashi Kunugise, Saitama (JP); Yousuke Naruse, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 187 days.

(21) Appl. No.: 15/789,196

(22) Filed: Oct. 20, 2017

(65) Prior Publication Data

US 2018/0045867 A1 Feb. 15, 2018

Related U.S. Application Data

(63) Continuation of application No. PCT/JP2016/062170, filed on Apr. 15, 2016.

(30) Foreign Application Priority Data

Apr. 23, 2015 (JP) ................................ 2015-088229

(51) Int. Cl.
*G02B 5/20* (2006.01)
*G03B 11/00* (2006.01)
(Continued)

(52) U.S. Cl.
CPC .............. *G02B 5/208* (2013.01); *G03B 11/00* (2013.01); *G06T 5/50* (2013.01); *G06T 7/254* (2017.01);
(Continued)

(58) Field of Classification Search
CPC ......... G03B 11/00; G03B 15/00; G06T 7/254; G06T 5/50; G06T 2207/10024;
(Continued)

(56) References Cited

U.S. PATENT DOCUMENTS 3,934,471 A 1/1976 White et al.
8,866,920 B2 * 10/2014 Venkataraman ....... H04N 5/332
348/218.1
(Continued)

FOREIGN PATENT DOCUMENTS

CN 101079149 A 11/2007
CN 102458228 A 5/2012
(Continued)

OTHER PUBLICATIONS

International Preliminary Report on Patentability (Form PCT/IPEA/409) issued in International Application No. PCT/JP2016/062170, dated Sep. 20, 2016, together with an English translation.
(Continued)

*Primary Examiner* — Pinalben Patel
(74) *Attorney, Agent, or Firm* — Birch, Stewart, Kolasch & Birch, LLP

(57) ABSTRACT

For causing a near-infrared light image obtained through imaging in a second imaging mode to be easily viewed while suppressing an increase in size and number of components, in a case where an imaging unit is operating in the second imaging mode, a change region where there is a change is detected through comparison with the second image data that the imaging unit has acquired before the second image data, from within the second image data acquired by the imaging unit. Combination image data obtained by combining the change region image data corresponding to the change region within the second image data with background image data of a color image generated on the basis of first image data acquired in a first imaging mode immediately before the second imaging mode by the imaging unit and corresponding to a background region different from the change region within the second image data is generated on the basis of the detection result of the change region.

10 Claims, 18 Drawing Sheets

(51) Int. Cl.
*G06T 5/50* (2006.01)
*H04N 9/07* (2006.01)
*H04N 5/225* (2006.01)
*H04N 5/232* (2006.01)
*H04N 1/407* (2006.01)
*H04N 5/33* (2006.01)
*G06T 7/254* (2017.01)
*G03B 15/00* (2006.01)

(52) U.S. Cl.
CPC ............ *H04N 1/407* (2013.01); *H04N 5/225* (2013.01); *H04N 5/2254* (2013.01); *H04N 5/232* (2013.01); *H04N 5/23222* (2013.01); *H04N 5/23229* (2013.01); *H04N 5/23245* (2013.01); *H04N 5/332* (2013.01); *H04N 9/07* (2013.01); *G03B 15/00* (2013.01); *G06T 2207/10024* (2013.01); *G06T 2207/10048* (2013.01); *G06T 2207/30196* (2013.01); *G06T 2207/30232* (2013.01); *H04N 5/2251* (2013.01)

(58) Field of Classification Search
CPC . G06T 2207/10048; G06T 2207/30196; G06T 2207/30232; H04N 5/225; H04N 5/232; H04N 9/07; H04N 5/2251; H04N 5/23222; H04N 1/407; H04N 5/2254; H04N 5/23229; H04N 5/23245; H04N 5/332; G02B 5/208
See application file for complete search history.

(56) References Cited

U.S. PATENT DOCUMENTS

| | | | |
|---|---|---|---|
| 8,866,937 B2 | 10/2014 | Kano | |
| 2005/0057687 A1* | 3/2005 | Irani | G06T 3/4069 348/443 |
| 2006/0266942 A1 | 11/2006 | Ikeda | |
| 2009/0001269 A1 | 1/2009 | Tadano | |
| 2009/0147111 A1* | 6/2009 | Litvinov | G06T 3/4015 348/273 |
| 2010/0165110 A1* | 7/2010 | Ohara | H04N 5/23229 348/164 |
| 2013/0215296 A1 | 8/2013 | Oniki et al. | |
| 2013/0278726 A1 | 10/2013 | Muhammad et al. | |
| 2016/0228002 A1 | 8/2016 | Ooban et al. | |
| 2017/0004603 A1* | 1/2017 | Irie | H04N 5/23229 |
| 2018/0047139 A1* | 2/2018 | Tanaka | G06T 5/003 |
| 2018/0047140 A1* | 2/2018 | Kunugise | G02B 13/18 |
| 2018/0365812 A1* | 12/2018 | Hayashi | G06T 5/003 |

FOREIGN PATENT DOCUMENTS

| | | |
|---|---|---|
| JP | 11-272849 A | 10/1999 |
| JP | 2006-333132 A | 12/2006 |
| JP | 2009-10675 A | 1/2009 |
| JP | 2011-128238 A | 6/2011 |
| JP | 2013-172213 A | 9/2013 |
| JP | 2014-507856 A | 3/2014 |
| JP | 2015-56674 A | 3/2015 |

OTHER PUBLICATIONS

International Search Report and Written Opinion of the International Searching Authority (Forms PCT/ISA/210 and PCT/ISA/237) issued in International Application No. PCT/JP2016/062170 dated Jun. 21, 2016, together with an English translation of the Search Report.
Japanese Notice of Allowance issued in Japanese Application No. 2017-514100 dated Oct. 31, 2017, together with an English translation.
Chinese Office Action and Search Report, dated Aug. 2, 2019, for corresponding Chinese Application No. 201680023422.8, with English translations.

* cited by examiner

FIG. 18
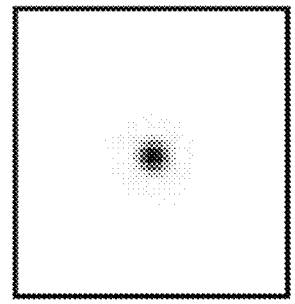
AMPLITUDE CORRECTION ⇧
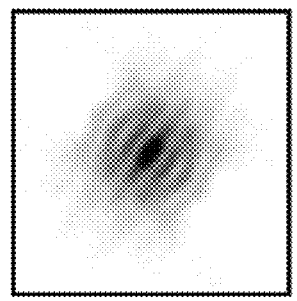
PHASE CORRECTION ⇧
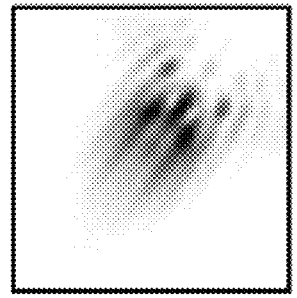

IMAGING DEVICE, IMAGE PROCESSING METHOD AND PROGRAM FOR IMAGING DEVICE

CROSS-REFERENCE TO RELATED APPLICATIONS

The present application is a Continuation of PCT International Application No. PCT/JP2016/062170 filed on Apr. 15, 2016 claiming priority under 35 U.S.C § 119(a) to Japanese Patent Application No. 2015-088229 filed on Apr. 23, 2015. Each of the above applications is hereby expressly incorporated by reference, in their entirety, into the present application.

BACKGROUND OF THE INVENTION

1. Field of the Invention

The present invention relates to an imaging device installed at a fixed position and performs imaging of a subject regardless of day and night, an image processing method and a program for the imaging device.

2. Description of the Related Art

In recent years, surveillance cameras (imaging devices) installed at fixed positions (fixed points) in public facilities, commercial facilities, residential areas, or the like to perform imaging of a subject regardless of day and night are widely used. In such a surveillance camera for day and night (also referred to as a day and night function), it is normal to capture a visible light image of a subject during daytime (day) and capture a near-infrared light image of the subject during nighttime.

JP2009-010675A describes a hybrid camera including a visible light camera that captures a visible light image of a subject, and an infrared camera that captures a thermal image of a subject. By applying the hybrid camera of JP2009-010675A to the surveillance camera to provide two types of imaging units to the surveillance camera, it is possible to capture a visible light image during daytime and a near-infrared light image during nighttime.

Further, the hybrid camera of JP2009-010675A generates background image data corresponding to a background region of the subject on the basis of image data of the visible light image, generates moving body image data corresponding to a moving body within the subject on the basis of image data of a thermal image, and generates combination image data obtained by combining the background image data with the moving body image data. Thus, by superimposing the moving body image based on a thermal image on the background image based on the visible light image, it is possible to provide an easy-to-view image.

JP2011-128238A discloses an imaging device that captures a visible light image of a subject through an optical system in which an infrared ray cut filter is inserted into an imaging optical path and captures a near-infrared light image of the subject through the optical system in which the infrared ray cut filter is retracted from the imaging optical path. By applying the imaging device in JP2011-128238A to the above-described surveillance camera for daytime and nighttime, capturing a visible light image during daytime and capturing a near-infrared light image during nighttime can be performed.

In this case, since an optical path length is changed according to the presence or absence of the infrared ray cut filter, a focal length is also greatly changed and image blur may be caused. Therefore, in the imaging device described in JP2011-128238A, a phase modulation element is provided in the above-described imaging optical path to suppress occurrence of image blur.

SUMMARY OF THE INVENTION

Meanwhile, since the near-infrared light image obtained through nighttime imaging of the surveillance camera is a monochrome image, there is a problem in that it is difficult for the near-infrared light image to be viewed as compared with the visible light image obtained through daytime imaging. Therefore, the technology described in JP2009-010675A is applied to the surveillance camera to combine background image data generated from visible light image data with moving body image data generated from near-infrared light image data to generate combination image data, such that the near-infrared light image can be easily viewed. However, in this case, it is necessary to simultaneously perform capturing a visible light image and capturing a near-infrared light image. That is, it is necessary to provide two types of imaging units for capturing a visible light image and capturing a near-infrared light image in the surveillance camera. As a result, there is a problem in that a size of the surveillance camera and the number of components increase.

Further, in a case where the technology described in JP2009-010675A is applied to a surveillance camera, it is necessary to perform capturing a visible light image during nighttime under low illuminance using a high-sensitivity camera, but in this case, there is a problem in that a noise in the visible light image increases.

JP2011-128238A describes that a phase modulation element is provided in an imaging optical path to suppress occurrence of image blur due to the presence or absence of an infrared ray cut filter, but does not describe or suggest generating combination image data as in JP2009-010675A. Therefore, in the imaging device of JP2011-128238A, a problem in that it is difficult to view the near-infrared light image of a monochrome image obtained through nighttime imaging as compared with the visible light image obtained through daytime imaging is not solved. Further, in the imaging device of JP2011-128238A, since it is necessary to provide the phase modulation element in the imaging optical path, there is a problem in that a size of the surveillance camera and the number of components increase.

The present invention has been made in view of such circumstances, and an object of the present invention is to provide an imaging device, and an image processing method and a program for an imaging device capable of causing a near-infrared light image to be easily viewed while suppressing an increase in size, and number of components.

An imaging device for achieving the object of the present invention is an imaging device installed at a fixed position, comprising: an optical system in which an infrared ray cut filter is insertable into an imaging optical path or retractable from the imaging optical path; an imaging unit having a first imaging mode in which the imaging unit images a subject through the optical system in which the infrared ray cut filter has been inserted into the imaging optical path to acquire first image data indicating a visible light image that is a visible light image of the subject, the visible light image being a color image, and a second imaging mode in which the imaging unit images the subject through the optical system in which the infrared ray cut filter has been retracted from the imaging optical path to acquire second image data including a near-infrared light image that is a near-infrared light image of the subject, the near-infrared light image being a monochrome image; an imaging mode switching unit that alternately switches between the first imaging mode and the second imaging mode; a change region detection unit that detects a change region having a change within the second image data acquired by the imaging unit when compared with the second image data that the imaging unit has acquired prior to the second image data in a case where the imaging unit is operating in the second imaging mode; and a combination image data generation unit that generates combination image data obtained by combining the change region image data corresponding to the change region within the second image data with background image data of the color image generated on the basis of the first image data acquired in the first imaging mode immediately before the second imaging mode by the imaging unit and corresponding to a background region different from the change region within the second image data on the basis of the detection result from the change region detection unit.

According to the present invention, it is possible to color-display the background region of the second image data including the near-infrared light image (monochrome image) acquired in the second imaging mode on the basis of the first image data indicating the visible light image (color image) acquired in the first imaging mode.

In the imaging device according to another aspect of the present invention, the combination image data generation unit generates the background image data on the basis of color information extracted from a region corresponding to the background region within the first image data, and the luminance information in the background region of the second image data. Accordingly, it is possible to reproduce an actual light and darkness on the basis of the luminance information, and to obtain a realistic image (combination image data).

In the imaging device according to still another aspect of the present invention, the combination image data generation unit generates the background image data using the image data itself included in the region corresponding to the background region within the first image data. Since the first image data of the visible light image is directly used as the background image data, the background image data is prevented from being affected by the above-described chromatic aberration (lateral chromatic aberration). Further, a load of a system is reduced since complex image processing or the like is not required to generate the background image data.

The imaging device according to still another aspect of the present invention further comprises a non-change region detection unit that detects a non-change region in the plurality of pieces of first image data that the imaging unit has acquired at different timings in the first imaging mode, and the combination image data generation unit generates the background image data from the image data corresponding to the non-change region within the first image data on the basis of a detection result from the non-change region detection unit. Accordingly, it is possible to remove a moving body from within the image based on the background image data.

The imaging device according to still another aspect of the present invention further comprises: a sharpening processing unit that performs a sharpening process on at least the change region image data. Accordingly, it is possible to correct chromatic aberration (lateral chromatic aberration) of visible light and near-infrared light.

The imaging device according to still another aspect of the present invention further comprises: a lateral chromatic aberration correction processing unit that performs a lateral chromatic aberration correction process on at least the change region image data. Accordingly, it is possible to correct chromatic aberration (lateral chromatic aberration) of visible light and near-infrared light.

The imaging device according to still another aspect of the present invention further comprises: a first point image restoration processing unit that performs a point image restoration process based on first optical characteristics of the optical system with respect to near-infrared light on at least the change region image data. Accordingly, it is possible to correct chromatic aberration (lateral chromatic aberration) of visible light and near-infrared light.

In the imaging device according to still another aspect of the present invention, the first optical characteristics are a first point spread function of the optical system with respect to the near-infrared light, and the point image restoration process that the first point image restoration processing unit performs on the change region image data includes restoring an amplitude component of the change region image data, and a phase component due to a shape of the non-point-symmetric, first point spread function. Accordingly, it is possible to correct chromatic aberration (lateral chromatic aberration) of visible light and near-infrared light.

In the imaging device according to still another aspect of the present invention, a point image restoration process based on second optical characteristics of the optical system with respect to visible light is performed on the first image data. Accordingly, it is possible to correct chromatic aberration (lateral chromatic aberration) of visible light and near-infrared light.

In the imaging device according to still another aspect of the present invention, the second optical characteristics are a second point spread function of each color of the optical system with respect to red, green, and blue visible light, and the point image restoration process that the second point image restoration processing unit performs on the first image data includes a process of restoring a phase component of the first image data using a restoration filter based on the second point spread function for each color. Accordingly, it is possible to correct chromatic aberration (lateral chromatic aberration) of visible light and near-infrared light.

An image processing method for an imaging device for achieving the object of the present invention is an image processing method for an imaging device comprising an optical system in which an infrared ray cut filter is insertable into an imaging optical path or retractable from the imaging optical path, an imaging unit having a first imaging mode in which the imaging unit images a subject through the optical system in which the infrared ray cut filter has been inserted into the imaging optical path to acquire first image data indicating a visible light image that is a visible light image of the subject, the visible light image being a color image, and a second imaging mode in which the imaging unit images the subject through the optical system in which the infrared ray cut filter has been retracted from the imaging optical path to acquire second image data including a near-infrared light image that is a near-infrared light image of the subject, the near-infrared light image being a monochrome image, and an imaging mode switching unit that alternately switches between the first imaging mode and the second imaging mode, the imaging device being installed at a fixed position, the method comprising: a change region detection step of detecting a change region having a change within the second image data acquired by the imaging unit when compared with the second image data that the imaging unit has acquired prior to the second image data in a case where the imaging unit is operating in the second imaging mode; and a combination image data generation step of generating combination image data obtained by combining the change region image data corresponding to the change region within the second image data with background image data of the color image generated on the basis of the first image data acquired in the first imaging mode immediately before the second imaging mode by the imaging unit and corresponding to a background region different from the change region within the second image data on the basis of the detection result in the change region detection step.

A program for achieving the object of the present invention causes a computer of an imaging device comprising an optical system in which an infrared ray cut filter is insertable into an imaging optical path or retractable from the imaging optical path, an imaging unit having a first imaging mode in which the imaging unit images a subject through the optical system in which the infrared ray cut filter has been inserted into the imaging optical path to acquire first image data indicating a visible light image that is a visible light image of the subject, the visible light image being a color image, and a second imaging mode in which the imaging unit images the subject through the optical system in which the infrared ray cut filter has been retracted from the imaging optical path to acquire second image data including a near-infrared light image that is a near-infrared light image of the subject, the near-infrared light image being a monochrome image, and an imaging mode switching unit that alternately switches between the first imaging mode and the second imaging mode, the imaging device being installed at a fixed position, to function as: change region detection means for detecting a change region having a change within the second image data acquired by the imaging unit when compared with the second image data that the imaging unit has acquired prior to the second image data in a case where the imaging unit is operating in the second imaging mode; and combination image data generation means for generating combination image data obtained by combining the change region image data corresponding to the change region within the second image data with background image data of the color image generated on the basis of the first image data acquired in the first imaging mode immediately before the second imaging mode by the imaging unit and corresponding to a background region different from the change region within the second image data on the basis of the detection result of the change region detection means. A non-transitory computer-readable tangible medium having the program recorded thereon is also included in the aspect of the present invention.

The imaging device, and the image processing method and a program for the imaging device of the present invention can cause a near-infrared light image obtained through imaging in the second imaging mode to be easily viewed while suppressing an increase in size, and the number of components.

BRIEF DESCRIPTION OF THE DRAWINGS

FIG. 18 is an illustrative diagram illustrating phase correction and amplitude correction in a point image restoration process.

DESCRIPTION OF THE PREFERRED EMBODIMENTS

[Entire Configuration of Surveillance Camera of First Embodiment]

Figure 1:
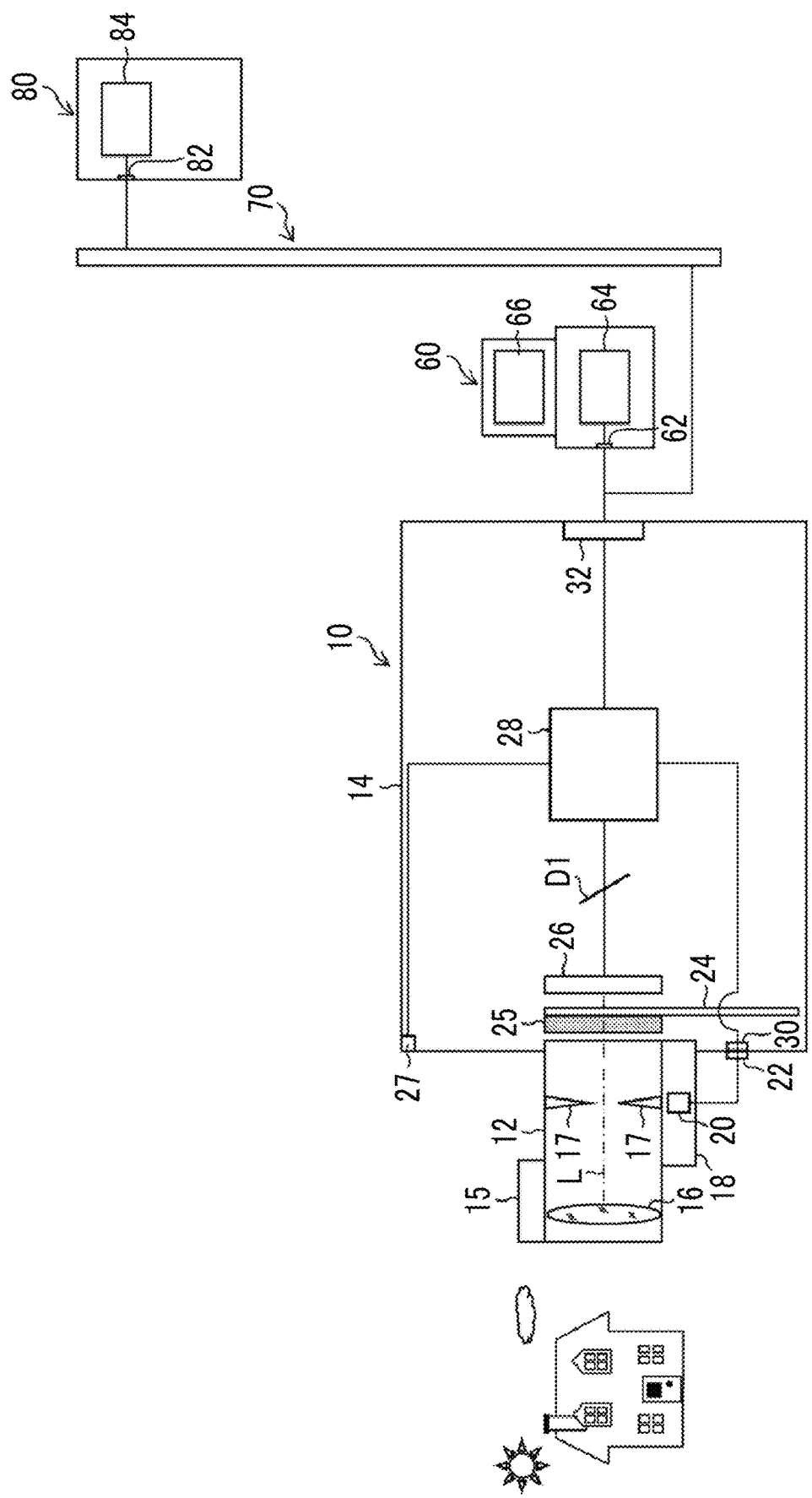
FIG. 1 is a block diagram illustrating an example of a functional configuration of a surveillance camera that is used for daytime and nighttime, and illustrates a state in which imaging is performed during daytime (day).
Figure 2:
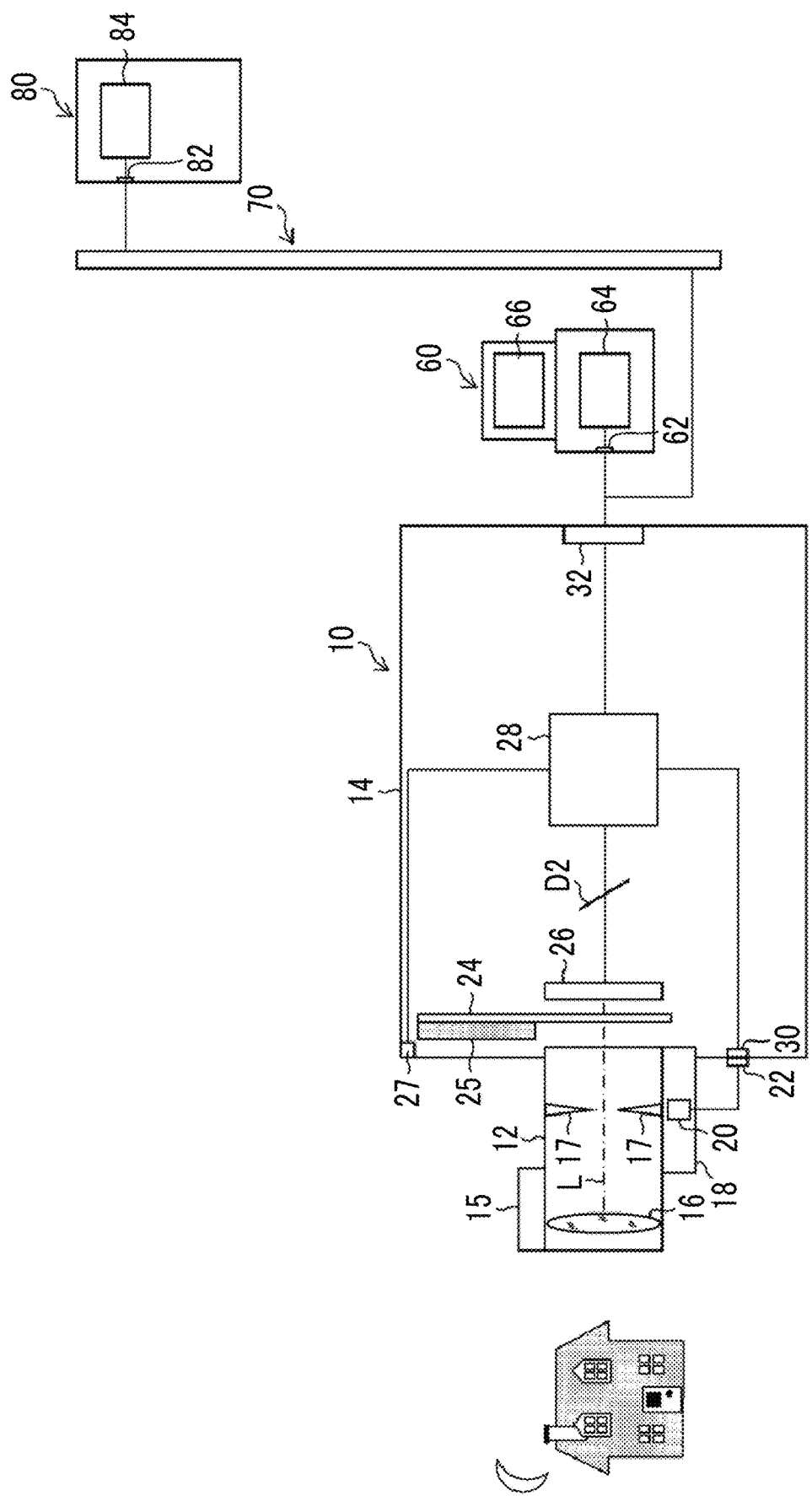
FIG. 2 is a block diagram illustrating a functional configuration example of the surveillance camera, and illustrates a state in which imaging is performed during nighttime.

FIG. 1 is a block diagram illustrating a functional configuration example of a surveillance camera 10 that is used for day and night, and illustrates a state in which imaging is performed during daytime (day). FIG. 2 is a block diagram illustrating an example of a functional configuration of the surveillance camera 10, and illustrates a state in which imaging is performed during nighttime. Here, "daytime" and "nighttime" described herein do not necessarily define a specific time zone, and "daytime" and "nighttime" may include dawn or twilight, respectively.

As illustrated in FIGS. 1 and 2, the surveillance camera 10 corresponding to an imaging device of the present invention is a type of digital camera, and is installed at a fixed position (fixed point) in public facilities, commercial facilities, residential areas, and the like. The surveillance camera 10 performs capturing a visible light image of a subject (surveillance region) during daytime and performs capturing a near-infrared light image of the subject during nighttime to perform capturing an image of the subject regardless of daytime and nighttime. Further, the surveillance camera 10 is connected to a computer 60 such as a personal computer (PC) or the like, and outputs image data obtained by imaging the subject to the computer 60.

Here, the near-infrared light image is an image that is obtained by imaging a subject at least with sensitivity to a wavelength band of near-infrared light. The wavelength band of this near-infrared light is not particularly limited and is in the range of 700 nm to 2500 nm. Further, the visible light image is an image that is obtained by imaging a subject with sensitivity to a wavelength band (generally 380 nm to 780 nm) of visible light.

The surveillance camera 10 includes a lens unit 12 and a camera body 14. An appearance of the surveillance camera 10 is not limited to the appearance illustrated in FIGS. 1 and 2 and, for example, the lens unit 12 and the camera body 14 may be covered with a transparent dome.

The lens unit 12 is provided on a front surface of the camera body 14. The lens unit 12 includes a near-infrared light emitting unit 15, a lens 16 including a focus lens, a zoom lens, and the like, an aperture 17, and a lens driving unit 18 that drives the lens 16 and the aperture 17.

The near-infrared light emitting unit 15 emits near-infrared light as an auxiliary light toward the subject when nighttime imaging is performed by the surveillance camera 10. Accordingly, even when the surveillance camera 10 performs imaging in the dark state during the nighttime (under low illuminance), image data of a clear near-infrared light image of the subject can be obtained.

The lens driving unit 18 includes a lens unit controller 20, and an actuator (not illustrated) that drives the lens 16 and the aperture 17. The lens unit controller 20 is electrically connected to the camera body 14 via a lens unit input and output unit 22 provided in the camera body 14. The lens unit controller 20 drives the lens 16 and the aperture 17 using the above-described actuator on the basis of a control signal input from the camera body 14. Accordingly, focus control and zoom control by lens movement of the lens 16 and aperture value control of the aperture 17 are performed.

The camera body 14 includes a filter driving unit 24, an infrared (IR) cut filter 25, an imaging unit 26, an illuminance sensor 27, a camera body controller 28, a camera body input and output unit 30, and an input and output interface 32, in addition to the lens unit input and output unit 22 described above.

The infrared ray cut filter 25 is a filter that cuts off infrared light, and constitutes an optical system of the present invention together with the lens 16 and the aperture 17 of the lens unit 12. The infrared ray cut filter 25 can be inserted into an imaging optical path L of the lens unit 12 or retracted from the imaging optical path L by the filter driving unit 24. Here, the imaging optical path L is an optical path until the light incident on the lens unit 12 reaches the imaging unit 26 to be described below. Although the infrared ray cut filter 25 is provided in the camera body 14 in this embodiment, the infrared ray cut filter 25 may be provided in the lens unit 12.

Under the control of the camera body controller 28, the filter driving unit 24 inserts the infrared ray cut filter 25 into the imaging optical path L at the time of capturing the visible light image of the subject (a first imaging mode to be described below) and retracts the infrared ray cut filter 25 from the imaging optical path L at the time of capturing near-infrared light image of the subject (a second imaging mode to be described below). Accordingly, it is possible to cut off infrared light that is incident on the imaging unit 26 to be described below at the time of capturing the visible light image. A type of the infrared ray cut filter 25 is not particularly limited and, for example, a near-infrared light cut filter that cuts off near-infrared light may be used.

The imaging unit 26 includes a charge coupled device (CCD) type imaging element or a complementary metal oxide semiconductor (CMOS) type imaging element, and various signal processing circuits. RGB pixels including color filters for three colors (or three or more colors) of red (R), green (G), and blue (B) are arranged in a matrix form on an imaging surface of an imaging element of the imaging unit 26 of this embodiment. The RGB pixels have sensitivity not only to a wavelength band of visible light but also to a portion of a wavelength band of near-infrared light (particularly, a wavelength band of near-infrared light that is emitted by the near-infrared light emitting unit 15), and functions as near-infrared light pixels at the time of capturing a near-infrared light image (in the second imaging mode to be described below).

The imaging unit 26 images the subject through the lens unit 12, acquires image data of the subject, and outputs the image data to the camera body controller 28. The imaging unit 26 has the first imaging mode corresponding to daytime imaging and the second imaging mode corresponding to nighttime imaging as imaging modes. Switching the imaging mode of the imaging unit 26 is executed by the camera body controller 28.

In the first imaging mode, the imaging unit 26 images the subject through the lens unit 12 in a state in which the infrared ray cut filter 25 has been inserted into the imaging optical path L, and acquires first image data D1 indicating a visible light image that is a color image of the subject. The first image data D1 includes image data of each color of RGB. In the first imaging mode, other conditions are arbitrary as long as the infrared ray cut filter 25 is inserted into the imaging optical path L.

Further, in the second imaging mode, the imaging unit 26 images the subject through the lens unit 12 in a state in which the infrared ray cut filter 25 is retracted from the imaging optical path L, and acquires second image data D2 including the near-infrared light image, which is a monochrome image of the subject. Here, the "second image data D2 including the near-infrared light image" means that incidence of the visible light on the imaging unit 26 does not become zero depending on a time zone or a surrounding environment even during nighttime, and the second image data D2 obtained through imaging of not only the near-infrared light but also the visible light is included. However, during nighttime imaging, the amount of visible light decreases and, in this embodiment, the near-infrared light emitting unit 15 emits near-infrared light as auxiliary light. Therefore, the amount of visible light incident on the imaging unit 26 is much smaller than the amount of near-infrared light. Therefore, the second image data D2 does not have color information and can be regarded as monochrome image data constituted by luminance information (luminance signal). In a case where incidence of the visible light on the imaging unit 26 in the second imaging mode becomes a problem, a visible light cut filter that cuts off the visible light may be inserted into the imaging optical path L.

The illuminance sensor 27 detects illuminance of the subject (surveillance region) that is imaged by the surveillance camera 10, and outputs a result of the illuminance detection to the camera body controller 28. The illuminance detection result from the illuminance sensor 27 may be used for, for example, switching between ON and OFF of the emission of the near-infrared light in the near-infrared light emitting unit 15, switching between the insertion and the retraction of the infrared ray cut filter 25, and switching between the imaging modes of the imaging unit 26.

The camera body controller 28 includes, for example, a calculation unit and a processing unit having various shapes including a central processing unit (CPU), and a storage unit (memory), and controls an operation or a process of the surveillance camera 10.

Figure 3:
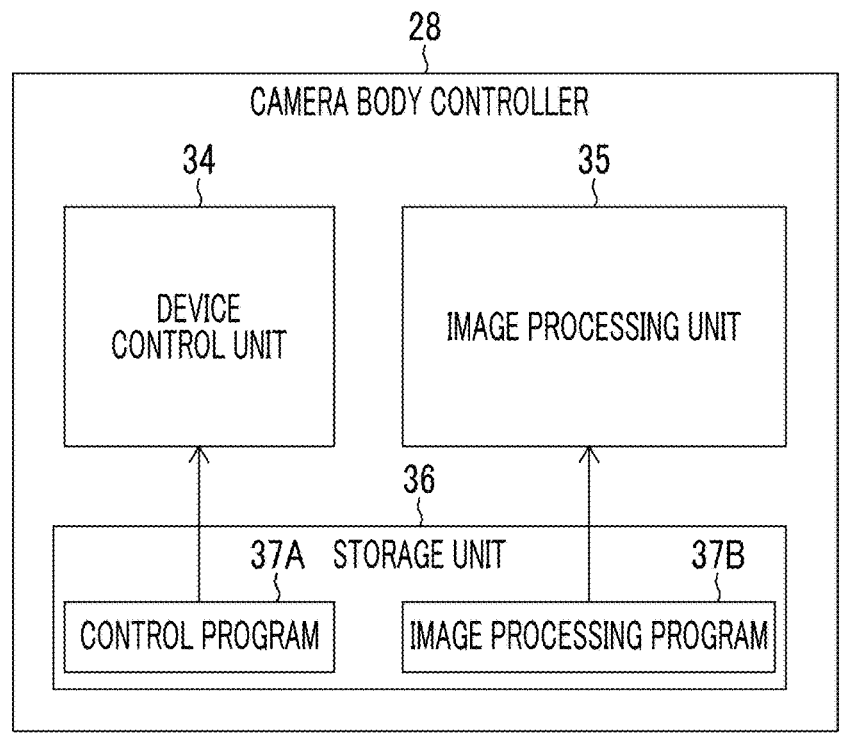
FIG. 3 is a block diagram illustrating an electrical configuration of a camera body controller.

FIG. 3 is a block diagram illustrating an electrical configuration of the camera body controller 28. As illustrated in FIG. 3, the camera body controller 28 includes a device control unit 34, an image processing unit 35, and a storage unit 36.

The device control unit 34 controls the operation of each unit of the surveillance camera 10 by executing a control program 37A read from the storage unit 36. For example, the device control unit 34 generates a control signal for controlling the lens unit 12, and transmits the control signal from the camera body input and output unit 30 to the lens unit controller 20 (see FIGS. 1 and 2). Accordingly, the focus control and the zoom control, and the aperture value control of the aperture 17 described above are executed. Further, the device control unit 34 controls an imaging process and a process of outputting the image data in the imaging unit 26.

Further, the device control unit 34 controls switching between the imaging modes of the imaging unit 26, switching between ON and OFF of the near-infrared light emission in the near-infrared light emitting unit 15, and switching between the insertion and the retraction of the infrared ray cut filter 25 on the basis of the illuminance detection result from the illuminance sensor 27. That is, the device control unit 34 functions as an imaging mode switching unit of the present invention.

Figure 4:
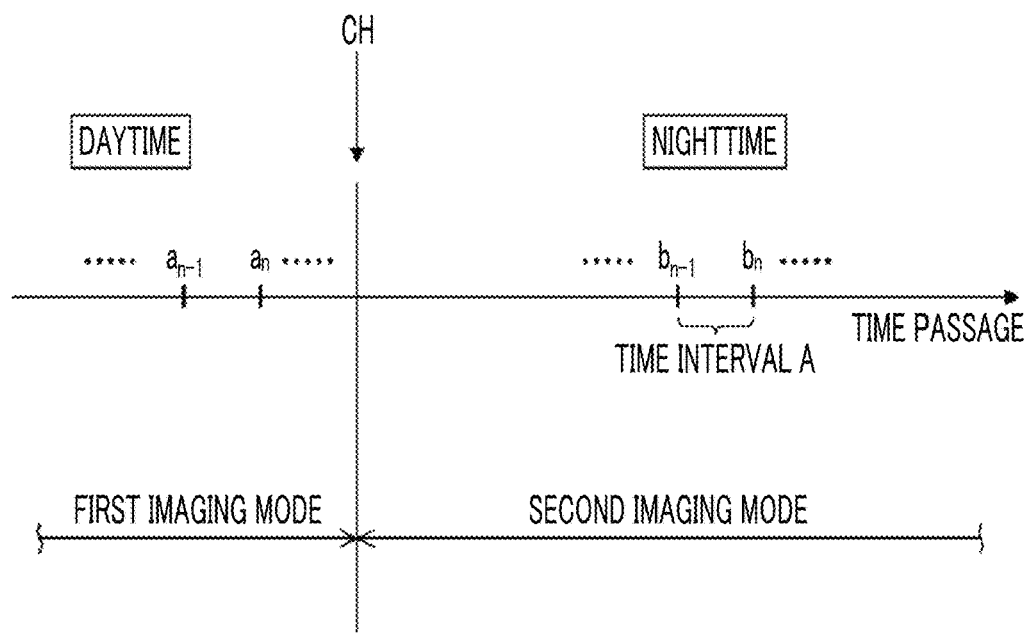
FIG. 4 is an illustrative diagram illustrating control of a device control unit (particularly, control of switching between imaging modes).

FIG. 4 is an illustrative diagram illustrating control (particularly, imaging mode switching control) in the device control unit 34. As illustrated in FIG. 4, the device control unit 34 performs switching between the imaging modes of the imaging unit 26 using the illuminance detection result for the subject input from the illuminance sensor 27 as an imaging mode switching condition. Specifically, when the illuminance detection result is equal to or greater than a predetermined threshold value, the device control unit 34 determines that current time is "daytime" and switches the imaging mode of the imaging unit 26 to the first imaging mode. Accordingly, the imaging unit 26 performs imaging in the first imaging mode. Reference signs "$a_{n-1}$" and "$a_n$" (n is an arbitrary natural number) in FIG. 4 indicate timings of imaging in the imaging unit 26.

On the other hand, when the illuminance detection result is smaller than the predetermined threshold value, the device control unit 34 determines that it is "nighttime" and switches the imaging mode of the imaging unit 26 to the second imaging mode. Thus, the imaging unit 26 performs imaging in the second imaging mode. Reference signs "$b_{n-1}$" and "$b_n$" indicate timings of imaging in the imaging unit 26, and a reference sign "A" indicates a time interval of imaging. The time interval of imaging in the first imaging mode is not particularly limited, and may be the same time interval A as in the second imaging mode.

Thus, the device control unit 34 alternately switches the imaging mode of the imaging unit 26 to the first imaging mode and the second imaging mode according to repetition of "daytime", "nighttime", "daytime", "nighttime", . . . that is discriminated from the illuminance detection result.

Further, in a case where the device control unit 34 switches the imaging unit 26 to the first imaging mode, the device control unit 34 controls the near-infrared light emitting unit 15 to turn the emission of the near-infrared light OFF, and controls the filter driving unit 24 to insert the infrared ray cut filter 25 into the imaging optical path L. Conversely, in a case where the device control unit 34 switches the imaging unit 26 to the second imaging mode, the device control unit 34 controls the near-infrared light emitting unit 15 to turn the emission of the near-infrared light ON, and controls the filter driving unit 24 to retract the infrared ray cut filter 25 from the imaging optical path L. A reference sign "CH" indicates a timing of switching the imaging mode, that is, a timing of switching the insertion and the retraction of the infrared ray cut filter 25.

Although the device control unit 34 of this embodiment performs switching of the imaging mode of the imaging unit 26 on the basis of the illuminance detection result of the illuminance sensor 27, the imaging mode switching condition is not limited to the illuminance detection result and may be appropriately changed. For example, a predetermined time zone ("daytime" is AM 6:00 to PM 6:00 and "nighttime" is PM 6:00 to AM 6:00) is selected as the imaging mode switching condition and switching the imaging mode of the imaging unit 26 may be performed according to the time zone.

Referring back to FIG. 3, the image processing unit 35 executes an image processing program 37B read from the storage unit 36 and performs image processing to be described below on the image data (the first image data D1 and the second image data D2) input from the imaging unit 26. The image processing unit 35 outputs the image data after the image processing to the input and output interface 32 (see FIGS. 1 and 2).

The image processing program 37B corresponds to a program of the present invention. The image processing program 37B will be described in detail below, and causes the image processing unit 35 constituting a portion of a computer of the surveillance camera 10 to function as a plurality of processing units including change region detection means (moving body region detection unit 48) of the present invention and combination image data generation means (a background image data generation unit 43 and a selection unit 50) of the present invention (see FIG. 5).

Referring back to FIGS. 1 and 2, the input and output interface 32 is wired or wirelessly connected to an external device (such as the computer 60), and outputs the image data after image processing to the computer 60 or the like. A format of the image data sent to the computer 60 or the like is not particularly limited, and may be an arbitrary format.

The computer 60 is connected to the surveillance camera 10 via the input and output interface 32 of the camera body 14 and the computer input and output unit 62, and receives data such as the image data sent from the surveillance camera 10. The computer 60 includes a computer controller 64 and a display 66.

The computer controller 64 performs the entire control of the computer 60. The computer controller 64 performs image process on the image data from the surveillance camera 10 and controls communication with a server 80 or the like connected to the computer input and output unit 62 via a network line 70 such as the Internet. The display 66 displays the image input from the surveillance camera 10.

The server 80 includes a server input and output unit 82 and a server controller 84. The server input and output unit 82 constitutes a transmission and reception connection unit for connection to the external device such the computer 60 and is connected to the computer input and output unit 62 via the network line 70. In response to a control instruction signal from the computer 60, the server controller 84 performs transmission and reception of data to and from the computer controller 64 in cooperation with the computer controller 64, as necessary, downloads the data to the computer 60, and performs a calculation process to transmit a calculation result to the computer 60.

The communication between the surveillance camera 10, the computer 60, and the server 80 may be any one of wired communication and wireless communication. Further, the computer 60 and the server 80 may be integrally configured or either or both of the computer 60 and the server 80 may be omitted. Further, the surveillance camera 10 may be caused to have a function of communication with the server 80 so that transmission and reception of data are directly performed between the surveillance camera 10 and the server 80.

[Configuration of Image Processing Unit]

Figure 5:
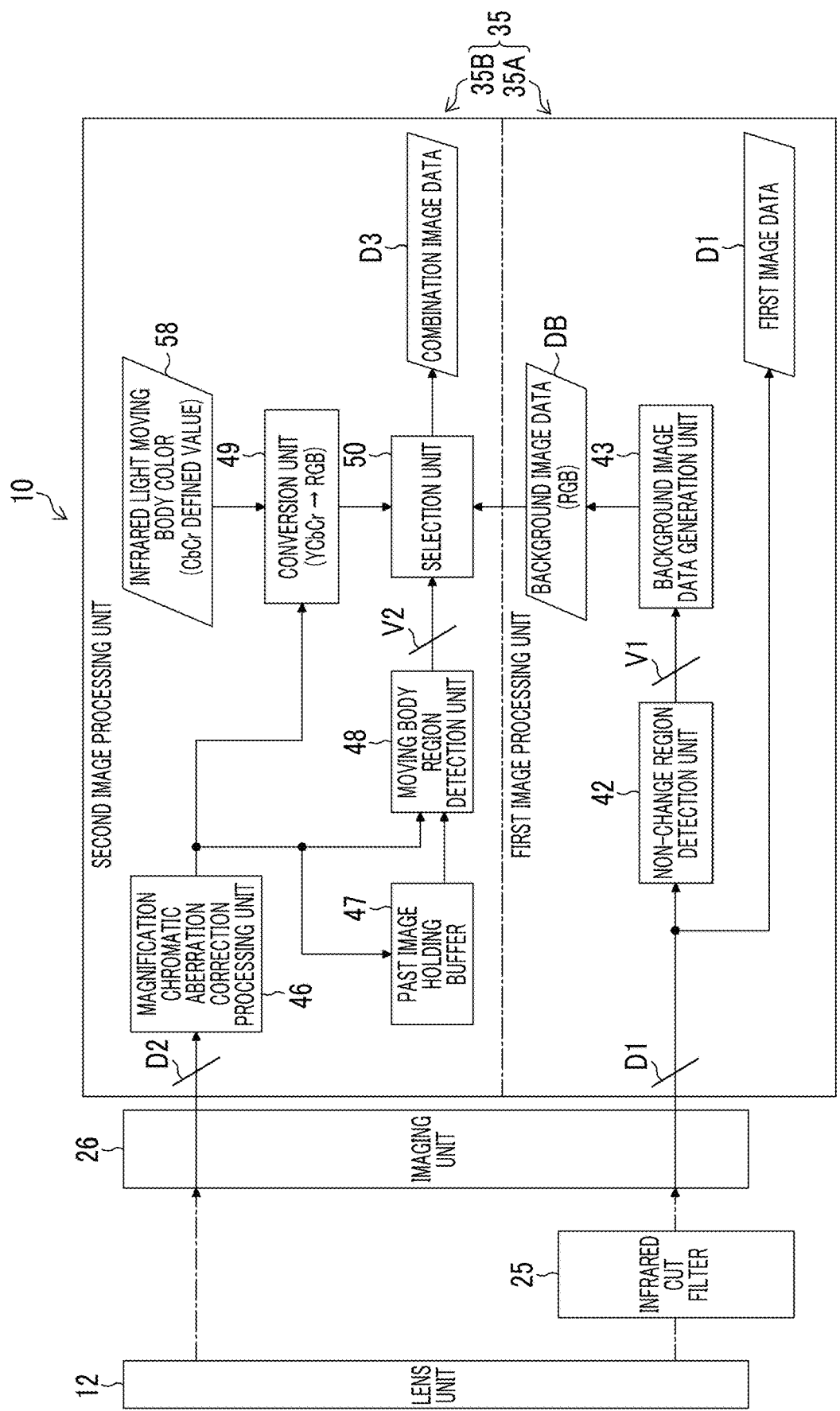
FIG. 5 is a functional block diagram of an image processing unit.

FIG. 5 is a functional block diagram of the image processing unit 35. The image processing unit 35 performs image process on the first image data D1 that is input from the imaging unit 26 and outputs the first image data D1 after the image processing to the input and output interface 32 in the first imaging mode. Further, the image processing unit 35 generates background image data DB corresponding to a background region of the subject on the basis of the first image data D1.

Figure 8:
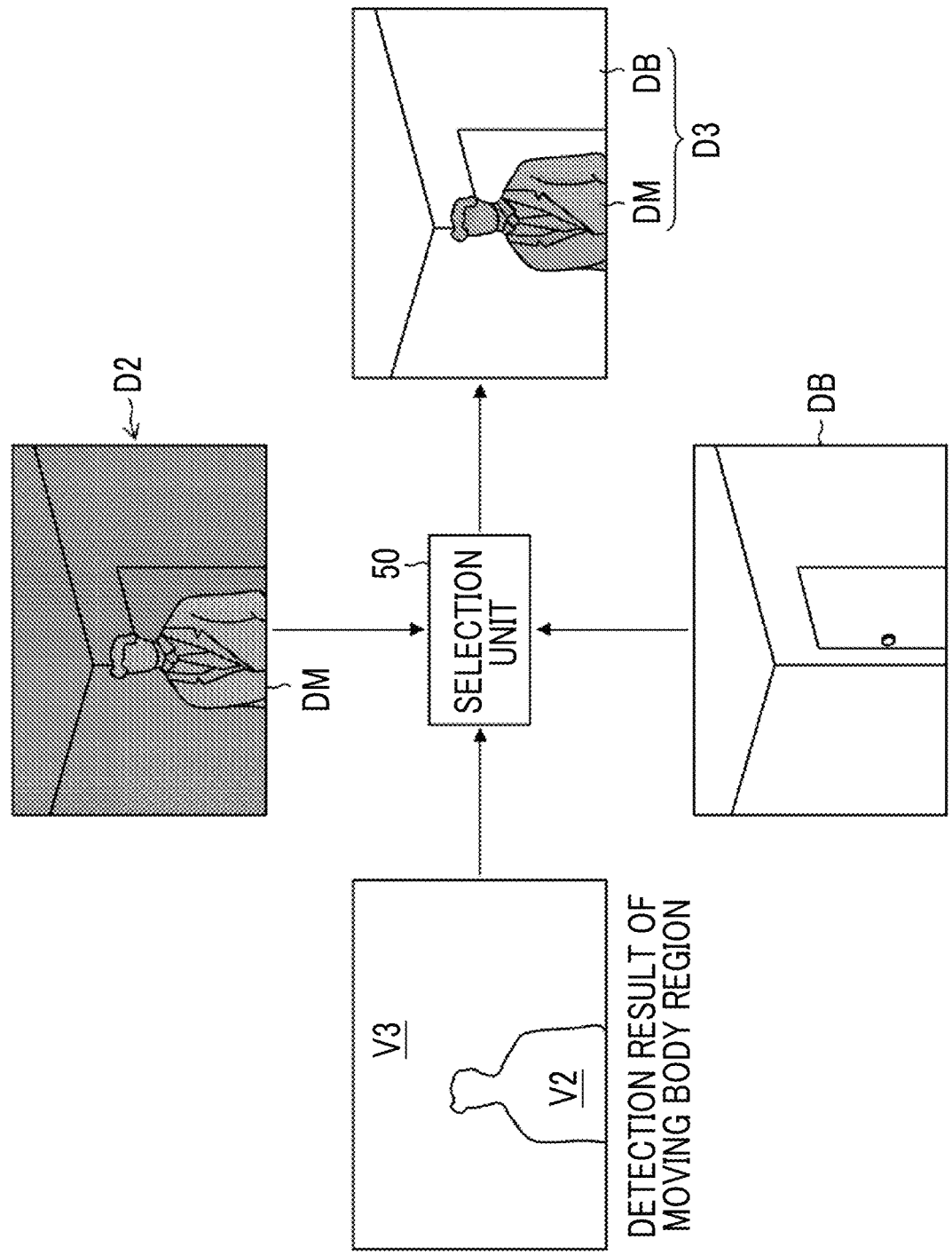
FIG. 8 is an illustrative diagram illustrating a process of generating combination image data in a selection unit.

On the other hand, in the second imaging mode, the image processing unit 35 generates combination image data D3 obtained by combining the background image data DB generated in the immediately previous first imaging mode with moving body image data DM (corresponding to change region image data of the present invention; see FIG. 8) corresponding to a moving body region within the second image data D2. That is, the image processing unit 35 color-displays the background region of the second image data D2 of the monochrome image that is acquired during nighttime on the basis of the first image data D1 of the color image acquired during daytime. In the second imaging mode, the background image data DB generated in the immediately previous first imaging mode is not particularly limited as long as the background image data DB is background image data DB generated in the first imaging mode before a transition from the first imaging mode to the second imaging mode (in the first imaging mode immediately before the current second imaging mode). For example, the background image data DB may be background image data DB generated on the basis of a last frame (the first image data D1) in the first imaging mode before a transition to the second imaging mode or background image data DB generated on the basis of a frame before the last frame by a specific period of time or a frame between such a frame and the last frame. Further, in a case where there is no change like the background image data DB, background image data DB generated on the basis of a frame between a timing at which there have been no change in the first imaging mode and the last frame in the first imaging mode may be used. Further, the average value or the like of the background image data DB in a plurality of frames may be used.

As illustrated in FIG. 5, the image processing unit 35 functions as a first image processing unit 35A in the first imaging mode and as a second image processing unit 35B in the second imaging mode by executing the image processing program 37B read from the storage unit 36 described above. Although the image processing unit 35 is divided into the first image processing unit 35A and the second image processing unit 35B for convenience of description in this embodiment, both may be integrally configured.

[First Image Processing Unit]

The first image processing unit 35A functions as a non-change region detection unit 42 and a background image data generation unit 43. The first image processing unit 35A performs image processing such as white balance correction or gradation correction on the first image data D1 input from the imaging unit 26 using an image processing circuit (not illustrated), and then, outputs the first image data D1 after the image processing to the input and output interface 32. Further, the first image processing unit 35A performs generation of the above-described background image data DB using the non-change region detection unit 42 and the background image data generation unit 43.

The non-change region detection unit 42 detects a non-change region V1 (corresponding to a background region V3 in FIG. 7) in the plurality of pieces of first image data D1 acquired at different timings by the imaging unit 26 in the first imaging mode. This non-change region V1 corresponds to a background region of the subject that is an imaging target (surveillance region) of the surveillance camera 10, and is a region in which a change is assumed not to occur irrespective of day and night.

Specifically, the non-change region detection unit 42 stores the first image data D1 acquired by the imaging unit 26 in the first imaging mode in a buffer (not illustrated) at each predetermined storage timing. The buffer includes a storage region for storing the first image data D1 of the plurality of frames, and the oldest first image data D1 in the buffer is overwritten with new first image data D1. The non-change region detection unit 42 analyzes the plurality of pieces of first image data D1 in the buffer to detect the non-change region V1 at each predetermined detection timing for the non-change region V1. Since a method that is basically the same as moving body region detection in the moving body region detection unit 48 to be described below is used as a method of detecting the non-change region V1, details thereof will be described below (see FIGS. 6 and 7). The non-change region detection unit 42 outputs the result (simply indicated as "V1" in FIG. 5) of detecting the non-change region V1 to the background image data generation unit 43.

The background image data generation unit 43 extracts image data corresponding to the non-change region V1 from the first image data D1 to generate background image data DB on the basis of the detection result of the non-change region V1 input from the non-change region detection unit 42 and the first image data D1 acquired by the imaging unit 26. Thus, by performing the generation of the background image data DB on the basis of the detection result of the non-change region V1, it is possible to remove the moving body from within the image based on the background image data DB. The background image data generation unit 43 stores the generated background image data DB in a memory (not illustrated) or the like. Hereinafter, the background image data generation unit 43 generates new background image data DB each time the detection result of the non-change region V1 is input from the non-change region detection unit 42, and updates the background image data DB stored in the memory or the like with the new background image data DB.

[Second Image Processing Unit]

The second image processing unit 35B functions as a lateral chromatic aberration correction processing unit 46, a past image holding buffer 47, a moving body region detection unit 48, a conversion unit 49, and a selection unit 50.

The second image processing unit 35B generates combination image data D3 obtained by combining the background image data DB generated by the first image processing unit 35A in the immediately previous first imaging mode with the moving body image data DM (see FIG. 8) corresponding to the moving body region in the second image data D2 acquired by the imaging unit 26 in the second imaging mode.

The lateral chromatic aberration correction processing unit 46 performs a lateral chromatic aberration correction process on the second image data D2 input at a time interval A from the imaging unit 26 (see FIG. 4) in the second imaging mode. In this embodiment, as described above, the combination image data D3 obtained by combining the background image data DB generated on the basis of the first image data D1 of the visible light image with the moving body image data DM within the second image data D2 of the near-infrared light image is generated. In this case, a difference occurs in sizes of the visible light image and the near-infrared light image captured by the imaging unit 26 due to the chromatic aberration (lateral chromatic aberration) of the visible light and the near-infrared light. Thus, the background image data DB and the second image data D2 (the moving body image data DM) having a different size (image size) are combined without any processing, and the unnatural combination image data D3 may be generated.

As the lens 16 used in the surveillance camera 10 of daytime and nighttime, a lens for daytime and nighttime that has realistic transmittance from visible light to a near-infrared region and in which chromatic aberration (lateral chromatic aberration) of the visible light and the near-infrared light has been optically corrected is used. However, complete correction of the chromatic aberration up to the near-infrared region is not generally realistic even in the lens for daytime and nighttime, and there are aberrations due to restrictions such as the number of lenses. Particularly, in a wide-angle zoom lens for surveillance, it is necessary to preferentially suppress defocusing of the visible light and the near-infrared light at a wide-angle end, and chromatic aberration (lateral chromatic aberration) tends not to be suppressed.

Therefore, the lateral chromatic aberration correction processing unit 46 performs a lateral chromatic aberration correction process on the second image data D2 input at a time interval A from the imaging unit 26 (see FIG. 4) to correct chromatic aberration (lateral chromatic aberration) of the visible light and the near-infrared light. The lateral chromatic aberration correction process is performed, for example, using a known method such as shifting a pixel position of each pixel of the second image data D2. Further, for the correction amount at this time, a correction amount determined in advance according to a type of optical system (the lens 16, the aperture 17, and the infrared ray cut filter 25) of the surveillance camera 10 is used. The lateral chromatic aberration correction processing unit 46 outputs the second image data D2 after the lateral chromatic aberration correction process to the past image holding buffer 47, the moving body region detection unit 48, and the conversion unit 49.

The past image holding buffer 47 temporarily stores the second image data D2 after the lateral chromatic aberration correction process input from the lateral chromatic aberration correction processing unit 46. For example, the past image holding buffer 47 includes a storage region that stores the second image data D2 of two frames. The oldest second image data D2 in the buffer is overwritten with the new first image data D1 input from the lateral chromatic aberration correction processing unit 46 to the past image holding buffer 47.

The moving body region detection unit 48 corresponds to a change region detection unit of the present invention. This moving body region detection unit 48 detects the moving body region V2 (see FIG. 7) corresponding to the moving body within the subject from within the second image data D2 which is newly input from the lateral chromatic aberration correction processing unit 46 (hereinafter, simply referred to as "new second image data D2"). The detection of the moving body region V2 is performed by comparing the new second image data D2 with the second image data D2 (hereinafter, simply referred to as "previous second image data D2") previously stored in the past image holding buffer 47 by the lateral chromatic aberration correction processing unit 46.

That is, the moving body region detection unit 48 detects, as the moving body region V2, a change region in which there is a change at the time of comparison with the second image data D2 obtained at an imaging timing "$b_{n-1}$" earlier by the time interval A from within the new second image data D2 obtained at an imaging timing "$b_n$" as illustrated in FIG. 4. Therefore, the moving body region V2 corresponds to a change region of the present invention. Further, herein, the "moving body" is not necessarily limited to an object that is moving within the subject (the surveillance region), and also includes an object that has not been present in the subject at the time of acquisition of the previous second image data D2.

Here, since a clear difference does not occur in a position, a shape, or the like of a moving body within the subject even when the new second image data D2 is compared with the previous second image data D2 in a case where the time interval A is set to be very short, it is not possible to detect the moving body region V2 corresponding to the moving body within the subject. Therefore, the time interval A is set as a time interval long enough to recognize a moving body within the subject from a difference between the new second image data D2 and the previous second image data D2 when the new second image data D2 is compared with the previous second image data D2, such as tens of seconds to several minutes.

Figure 6:
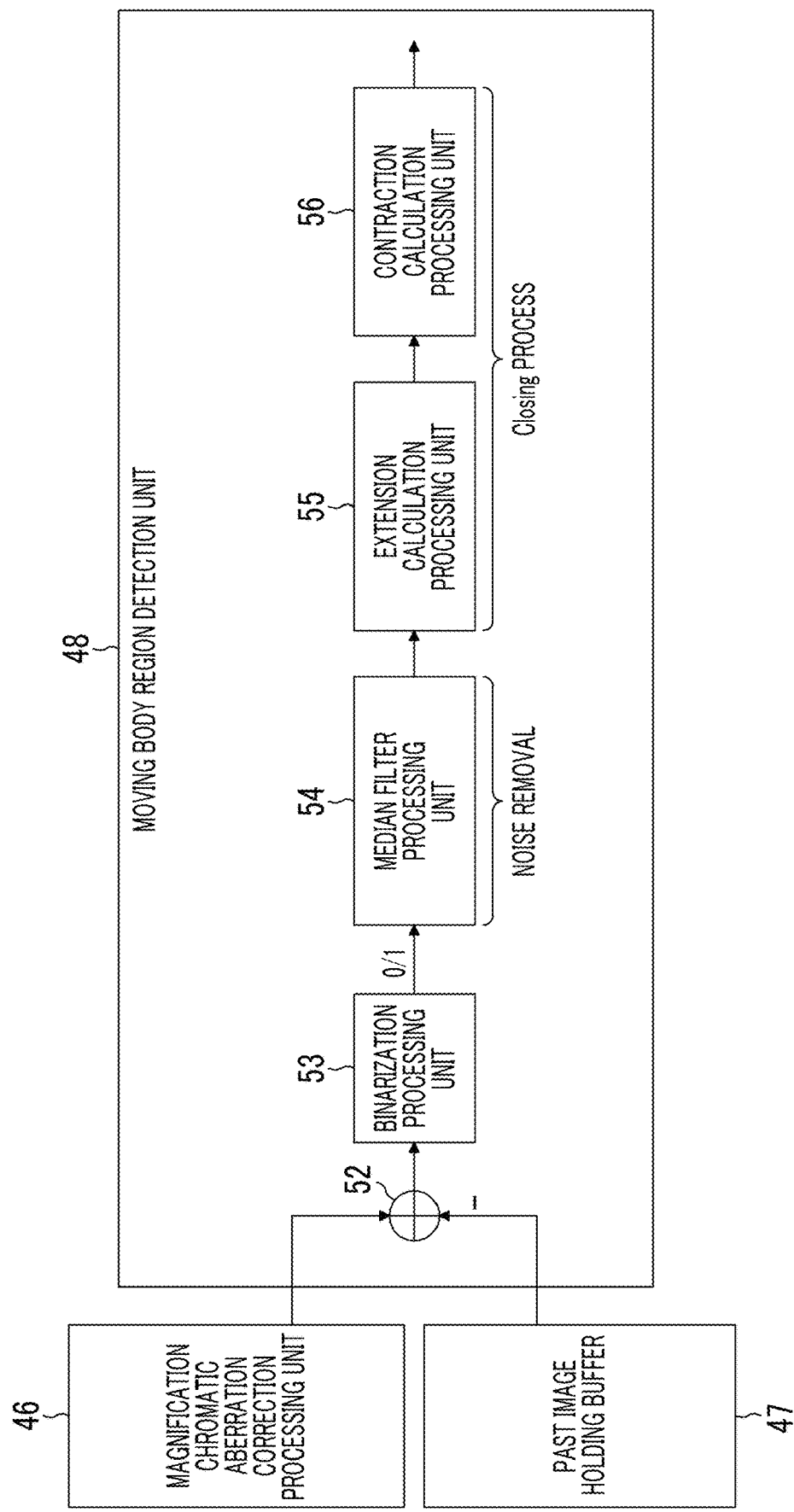
FIG. 6 illustrates an example of a functional block diagram of a moving body region detection unit.
Figure 7:
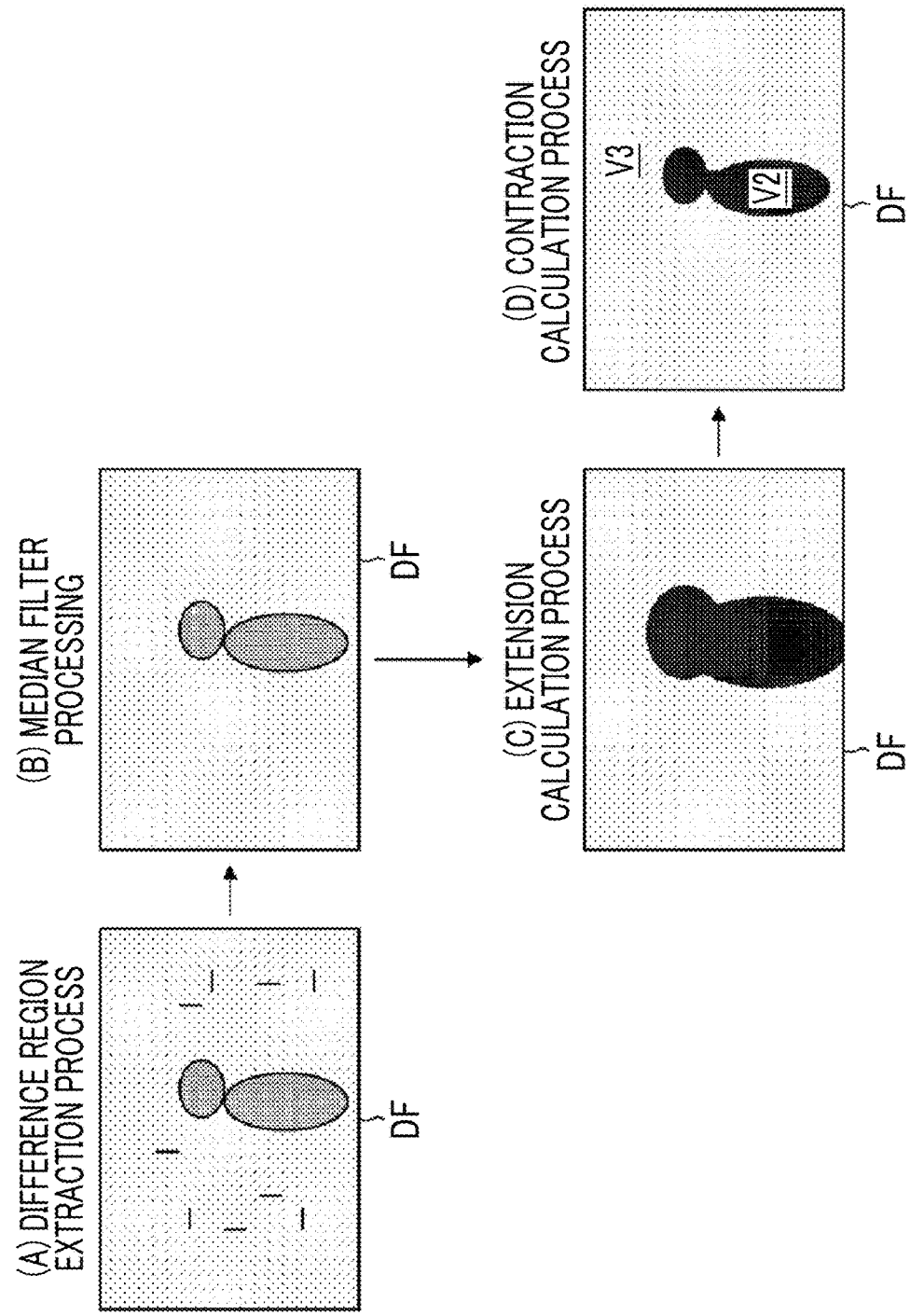
FIG. 7 is a diagram illustrating a flow of a moving body region detection process in a moving body region detection unit.

FIG. 6 is a diagram illustrating an example of a functional block diagram of the moving body region detection unit 48. Further, FIG. 7(A) to (D) is an illustrative diagram illustrating a flow of a detection process of the moving body region V2 in the moving body region detection unit 48. In FIG. 7, it is assumed as description that a moving body not present within the subject at the time of acquisition of the previous second image data D2 appears within the subject at the time of acquisition of the new second image data D2.

As illustrated in FIG. 6, the moving body region detection unit 48 includes a difference region extraction unit 52, a binarization processing unit 53, a median filter processing unit 54, an extension calculation processing unit 55, and a contraction calculation processing unit 56.

As illustrated in FIG. 7(A), the difference region extraction unit 52 performs a difference region extraction process of extracting a difference region between the new second image data D2 and the previous second image data D2 to generate difference region extraction image data DF indicating a result of the difference region extracting process. In an actual imaging system, in a case where there is an imaging interval between two pieces of image data (second image data D2), an offset value of a quantum level (QL) value for each image is changed due to a change in dark current component or a change in the amount of environmental light over time, which may cause a phenomenon that the QL value is greatly changed even in a region that is not the moving body region V2. Therefore, it is necessary to provide a robust moving body detection process such as application of offset correction over time or ignoring of a direct current (DC) component from an image comparison target in consideration of such a phenomenon. However here, it is assumed for simplification of the process that the change in such a QL value does not occur, and the change in QL value occurs only in a region in which there is a moving body.

Then, the binarization processing unit 53 performs a binarization process on the difference region extraction image data DF. Thus, for each pixel of the difference region extraction image data DF, the luminance value is converted to "1" in a case where the luminance value is equal to or greater than a predetermined threshold value and, on the contrary, the luminance value is converted to "0" in a case where the luminance value is smaller than the predetermined threshold value. As a result, for example, the luminance value of the pixel corresponding to the moving body region V2 within the difference region extraction image data DF is converted to "1", and the luminance value of the pixel corresponding to the background region V3 within the difference region extraction image data DF is converted to "0". The background region V3 is substantially the same as the non-change region V1 in the first image data D1 described above.

As illustrated in FIG. 7(B), the median filter processing unit 54 performs a median filter process on the difference region extraction image data DF after the binarization process to remove noise such as dark noise mixed in the difference region extraction image data DF.

As illustrated in FIGS. 7(C) and 7(D), the extension calculation processing unit 55 and the contraction calculation processing unit 56 perform a closing process on the difference region extraction image data DF after the median filter processing. Specifically, The extension calculation processing unit 55 performs an extension calculation process on the difference region extraction image data DF (see FIG. 7(C)), and then, the contraction calculation processing unit 56 performs a contraction calculation process on the difference region extraction image data DF (see FIG. 7(D)). Through the closing process (the extension calculation process and the contraction calculation process), a fine (small) pattern included in the difference region extraction image data DF is removed. As a result, each of the moving body region V2 and the background region V3 in the difference region extraction image data DF is prevented from being mottled.

In the difference region extraction image data DF after the closing process, a region in which pixels having a luminance value of "1" are gathered is the moving body region V2, and on the other hand, a region in which pixels having a luminance value of "0" are gathered is the background region V3. Therefore, the moving body region detection unit 48 can detect the moving body region V2 of the new second image data D2 on the basis of the position coordinates of each pixel constituting the moving body region V2 within the difference region extraction image data DF. The moving body region detection unit 48 outputs the position coordinates of the pixels constituting the moving body region V2 to the selection unit 50 as a detection result of the moving body region V2 within the new second image data D2 (simply indicated "V2" in FIG. 5).

The non-change region detection unit 42 described above detects the non-change region V1 (corresponding to the background region V3) within the plurality of pieces of first image data D1 acquired at different timings using basically the same method as in the moving body region detection unit 48 illustrated in FIGS. 6 and 7 (here, detects the background region V3 in place of the moving body), and outputs a result of the detection to the background image data generation unit 43.

Referring back to FIG. 5, the conversion unit 49 converts the new second image data D2 input from the lateral chromatic aberration correction processing unit 46 into RGB image data similar to the first image data D1 (the background image data DB) described above. Here, the second image data D2 is image data including only the luminance information (luminance signal) described above, and has no color information. Therefore, the conversion unit 49 adds the color information to the second image data D2 and then converts the second image data D2 into the RGB image data.

First, the conversion unit 49 adds infrared light moving body color 58 (a CbCr defined value) that is predetermined color information to the new second image data D2 input from the lateral chromatic aberration correction processing unit 46 to convert the second image data D2 into YCbCr image data. Thus, color information is added to the moving body image data DM (see FIG. 8) within the second image data D2 serving as the combination image data D3, such that the moving body image data DM in the combination image data D3 can be color-displayed. The infrared light moving body color 58 is for determining the color of the moving body that is displayed in the image based on the combination image data D3, and an arbitrary color can be selected.

Next, the conversion unit 49 converts the second image data D2 that is the YCbCr image data into RGB image data and outputs the RGB image data to the selection unit 50.

The selection unit 50 constitutes a combination image data generation unit of the present invention together with the background image data generation unit 43 described above. The selection unit 50 generates combination image data D3 obtained by combining the background image data DB generated by the background image data generation unit 43 in the immediately previous first imaging mode with the moving body image data DM corresponding to the moving body region V2 within the second image data D2 on the basis of a detection result of the moving body region V2 input from the moving body region detection unit 48.

FIG. 8 is an illustrative diagram illustrating a process of generating combination image data D3 in the selection unit 50. A hatching display of the second image data D2 in FIG. 8 shows that the infrared light moving body color 58 described above is added.

As illustrated in FIG. 8, the selection unit 50 determines which of the moving body region V2 and the background region V3 the first pixel (for example, a pixel at the lower left corner) of the combination image data D3 belongs to, on the basis of the detection result of the moving body region V2 input from the moving body region detection unit 48. In a case where the first pixel of the combination image data D3 belongs to the background region V3, the selection unit 50 selects the first pixel in the background image data DB from among the first pixels (the pixels at lower left corners) of the background image data DB and the second image data D2, and outputs the first pixel.

On the other hand, in a case where the first pixel of the combination image data D3 belongs to the moving body region V2, the selection unit 50 selects the first pixel in the second image data D2 from among the first pixels of the background image data DB and the second image data D2, and outputs the first pixel.

Hereinafter, similarly, for the N-th pixel of the rest of the combination image data D3, the selection unit 50 outputs the N-th pixel selected from one of the background image data DB and the second image data D2 on the basis of the detection result of the moving body region V2. Here, "N" is a number equal to or greater than 2 and equal to or smaller than a total number of pixels of the combination image data D3. Thus, the pixel of the second image data D2 is selected as the pixel belonging to the moving body region V2 among the respective pixels of the combination image data D3, and the pixel of the background image data DB is selected as the pixel belonging to the background region V3. As a result, the combination image data D3 obtained by combining the background image data DB with the moving body image data DM corresponding to the moving body region V2 in the second image data D2 is generated.

In a case where the moving body region V2 is not detected by the moving body region detection unit 48 described above, the selection unit 50 generates combination image data D3 on the basis of only the background image data DB.

Hereinafter, in the second image processing unit 35B, each time the second image data D2 is input at the time interval A from the imaging unit 26, the lateral chromatic aberration correction process in the lateral chromatic aberration correction processing unit 46, the moving body region detection process in the moving body region detection unit 48, the conversion process in the conversion unit 49, and the combination image data generation process in the selection unit 50 are executed and the combination image data D3 is generated. Image processing such as white balance correction or gradation correction is performed on the combination image data D3 by an image processing circuit (not illustrated), and then, is output from the second image processing unit 35B to the input and output interface 32.

[Operation of Surveillance Camera of First Embodiment]

Figure 9:
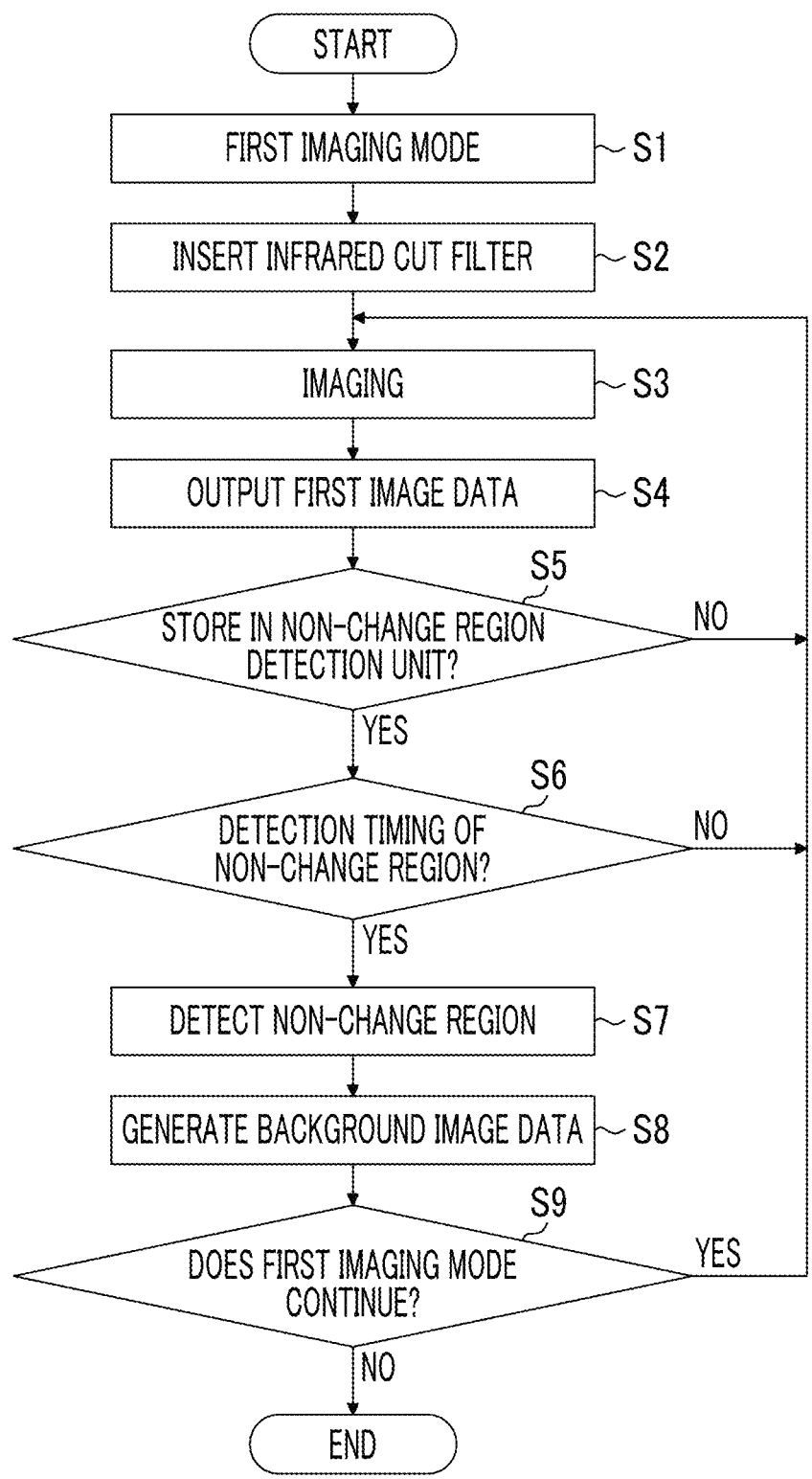
FIG. 9 is a flowchart illustrating a flow of an imaging process and image processing of the surveillance camera in a first imaging mode.
Figure 10:
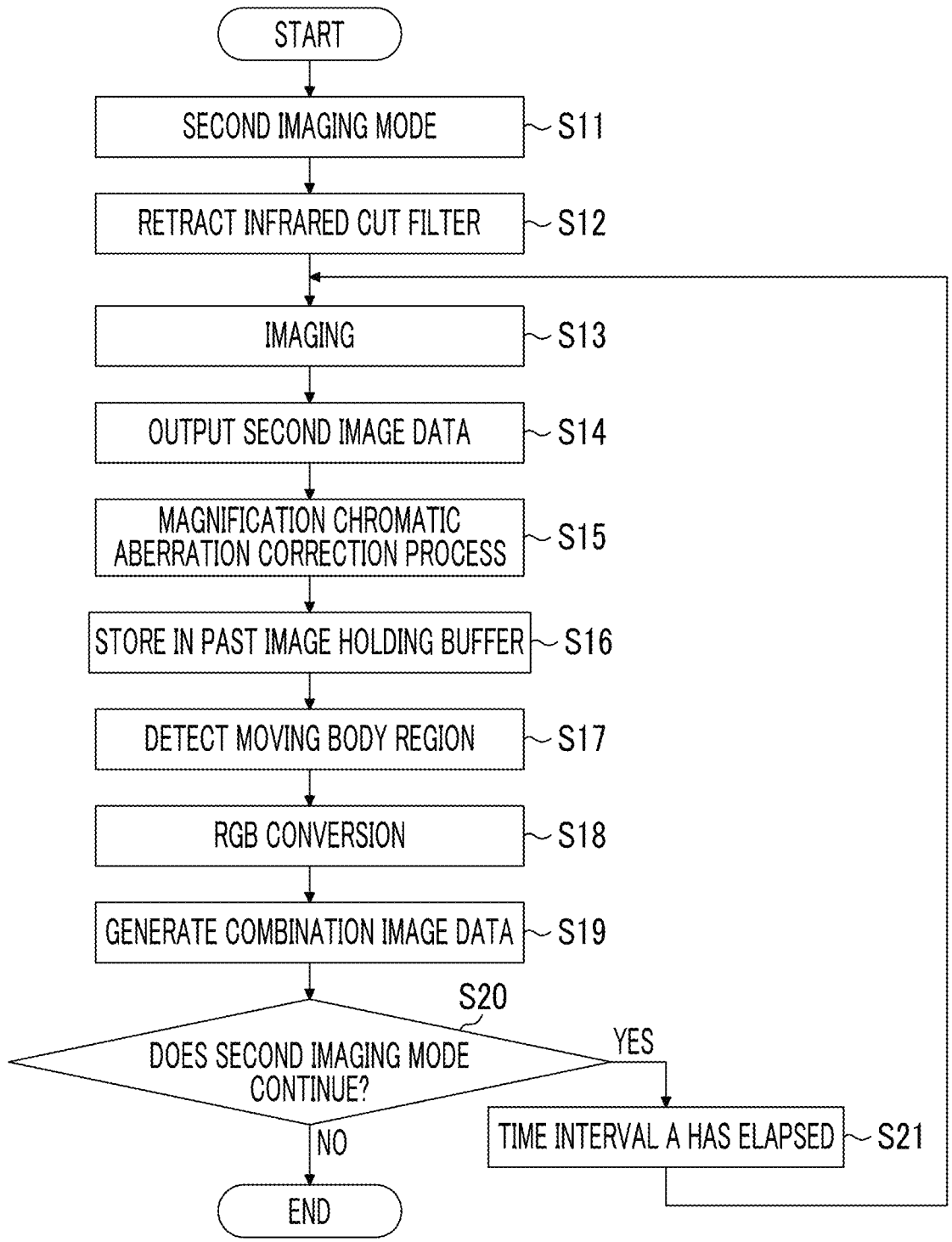
FIG. 10 is a flowchart illustrating a flow of an imaging process and image processing of the surveillance camera in a second imaging mode.

Next, an operation of the surveillance camera 10 having the above configuration, and particularly, an imaging process and image processing (an image processing method for the imaging device of the present invention) will be described with reference to FIGS. 9 and 10. Here, FIG. 9 is a flowchart illustrating a flow of an imaging process and image processing in the surveillance camera 10 in the first imaging mode. Further, FIG. 10 is a flowchart illustrating a flow of an imaging process and image processing in the surveillance camera 10 in the second imaging mode.

<First Imaging Mode>

As illustrated in FIG. 9, in a case where the device control unit 34 determines that switching from the "nighttime" to "daytime" has occurred on the basis of the illuminance detection result for the subject input from the illuminance sensor 27, the device control unit 34 switches the imaging mode of the imaging unit 26 to the first imaging mode (step S1). Further, simultaneously, the device control unit 34 controls the near-infrared light emitting unit 15 to cause emission of the near-infrared light to be turned OFF, and controls the filter driving unit 24 to cause the infrared ray cut filter 25 to be inserted into the imaging optical path L (step S2).

Then, the device control unit 34 causes the imaging unit 26 to start capturing the visible light image of the subject (surveillance region) in the first imaging mode. The imaging unit 26 images the subject through the lens unit 12 in a state in which the infrared ray cut filter 25 has been inserted into the imaging optical path L to acquire the first image data D1 indicating the visible light image of the subject that is a color image (step S3). The imaging unit 26 outputs the first image data D1 to the image processing unit 35 (step S4).

The first image data D1 output from the imaging unit 26 is input to the first image processing unit 35A of the image processing unit 35. In the first image processing unit 35A, image processing such as white balance correction or gradation correction is performed on the first image data D1 by an image processing circuit (not illustrated) and then is output to the input and output interface 32. The first image data D1 subjected to the image processing is output from the input and output interface 32 to one or both of the computer 60 and the server 80. Hereinafter, each time the first image data D1 is input from the imaging unit 26, the image processing for the first image data D1 and the output to the computer 60 or the like are repeatedly executed (NO in step S5).

In this case, the first image data D1 input from the imaging unit 26 is stored in the buffer of the non-change region detection unit 42 at each predetermined storage timing (YES in step S5). The imaging in the imaging unit 26 is continuously performed until the detection timing of the non-change region V1 in the non-change region detection unit 42 (NO in step S5 or S6), and therefore, the plurality of pieces of first image data D1 acquired at different timings are stored in the buffer of the non-change region detection unit 42.

When the detection timing of the non-change region V1 is reached, the non-change region detection unit 42 analyzes the plurality of pieces of first image data D1 in the buffer to detect the non-change region V1 on the basis of the method described in FIGS. 6 and 7 described above (YES in step S6, and step S7). The non-change region detection unit 42 outputs the detection result of the non-change region V1 to the background image data generation unit 43.

The background image data generation unit 43 extracts image data corresponding to the non-change region V1 from the first image data D1 input from the imaging unit 26 to generate the background image data DB on the basis of the detection result of the non-change region V1 input from the non-change region detection unit 42 (step S8). The background image data DB is stored in the memory (not illustrated) or the like by the background image data generation unit 43.

Hereinafter, the processes from step S3 to step S8 described above are repeatedly executed while the first imaging mode is maintained (YES in step S9). Thus, the storage of the first image data D1 in the buffer of the non-change region detection unit 42, the detection of the non-change region V1 in the non-change region detection unit 42, and the generation of the background image data DB in the background image data generation unit 43 are repeatedly executed, and the background image data DB stored in the memory or the like described above is updated. As will be described below, when the imaging mode of the imaging unit 26 is switched to the second imaging mode, the imaging process and the image processing in the first imaging mode end (NO in step S9).

<Second Imaging Mode>

As illustrated in FIG. 10, in a case where the device control unit 34 determines that switching from "daytime" to "nighttime" has occurred on the basis of the illuminance detection result for the subject input from the illuminance sensor 27, the device control unit 34 switches the imaging mode of the imaging unit 26 from the first imaging mode to the second imaging mode (step S11). Further, simultaneously, the device control unit 34 controls the near-infrared light emitting unit 15 to cause the emission of the near-infrared light to be turned ON, and controls the filter driving unit 24 to cause the infrared ray cut filter 25 to be retracted from the imaging optical path L (step S12).

Then, the device control unit 34 causes the imaging unit 26 to start capturing the infrared light image of the subject in the second imaging mode. The imaging unit 26 images the subject through the lens unit 12 in a state in which the infrared ray cut filter 25 is retracted from the imaging optical path L, to acquire second image data D2 including the near-infrared light image of the subject that is a monochrome image (step S13). The imaging unit 26 outputs the second image data D2 to the image processing unit 35 (step S14).

The second image data D2 output from the imaging unit 26 is input to the second image processing unit 35B in the image processing unit 35. The lateral chromatic aberration correction processing unit 46 of the second image processing unit 35B performs a lateral chromatic aberration correction process on the second image data D2 input from the imaging unit 26 (step S15). Accordingly, since chromatic aberration (lateral chromatic aberration) of the visible light and the near-infrared light is corrected, and sizes (image sizes) of the background image data DB and the second image data D2 can match each other, unnatural combination image data D3 is prevented from being generated.

Further, the lateral chromatic aberration correction process in the lateral chromatic aberration correction processing unit 46 is a software process, and can be performed without hardware addition such as providing a phase modulation element in the imaging optical path, as described in JP2011-128238A. As a result, it is possible to suppress an increase in size of the surveillance camera 10 and number of components thereof.

Although the lateral chromatic aberration correction processing unit 46 of this embodiment has performed the lateral chromatic aberration correction process on the entire second image data D2, for example, the detection of the moving body region V2 in the moving body region detection unit 48 may first be performed before the lateral chromatic aberration correction process and the lateral chromatic aberration correction process may be performed on the moving body region V2 within the second image data in the D2 on the basis of a result of the detection. That is, the lateral chromatic aberration correction processing unit 46 may perform the lateral chromatic aberration correction process on at least the moving body region V2 within the second image data D2.

Then, the lateral chromatic aberration correction processing unit 46 outputs the second image data D2 after the lateral chromatic aberration correction process to the past image holding buffer 47, the moving body region detection unit 48, and the conversion unit 49. Accordingly, the new second image data D2 is stored in the past image holding buffer 47 (step S16).

Although not illustrated, after the switching to the second imaging mode, at least the acquisition of the second image data D2 in the imaging unit 26 is performed two or more times, and the "previous second image data D2" described above is stored in the past image holding buffer 47. Accordingly, the moving body region V2 can be detected by the moving body region detection unit 48. In the following description, it is assumed that the "previous second image data D2" described above is stored in the past image holding buffer 47.

In a case where the new second image data D2 is input from the lateral chromatic aberration correction processing unit 46, the moving body region detection unit 48 starts the detection of the moving body region V2. As described in FIGS. 6 and 7 described above, the moving body region detection unit 48 compares the new second image data D2 with the previous second image data D2 within the past image holding buffer 47 to detect the moving body region V2 within the new second image data D2 (step S17, corresponding to a change region detection step of the present invention). The moving body region detection unit 48 outputs the detection result for the moving body region V2 to the selection unit 50.

The conversion unit 49 adds the color information based on the infrared light moving body color 58 (CbCr defined value) to the new second image data D2 input from the lateral chromatic aberration correction processing unit 46 to convert the second image data D2 into YCbCr image data, and then, converts the YCbCr image data into RGB image data (step S18). The conversion unit 49 outputs the second image data D2 converted into the RGB image data to the selection unit 50.

At the time of switching to the second imaging mode, the selection unit 50 reads the background image data DB that the first background image data generation unit 43 has generated in the immediately previous first imaging mode, from the memory or the like described above. The selection unit 50 combines the moving body image data DM corresponding to the moving body region V2 within the second image data D2 input from the conversion unit 49 with the background image data DB on the basis of the detection result for the moving body region V2 input from the moving body region detection unit 48, as described with reference to FIG. 8 described above. Thus, the combination image data D3 is generated (step S19, corresponding to a combination image data generation step of the present invention).

Such combination image data D3 can be image data colored by applying the color information (color information) of the first image data D1 that is the color image acquired in the daytime to a portion corresponding to the background region V3 within the second image data D2. As a result, within the image obtained through the nighttime imaging, the color information of subject in the daytime is added to the same subject as the subject reflected in the image obtained through daytime imaging. Therefore, it is possible to easily view the near-infrared light image obtained through nighttime imaging.

The combination image data D3 is subjected to image processing such as white balance correction or gradation correction by the image processing circuit (not illustrated), and then, is output from the second image processing unit 35B to the input and output interface 32. The combination image data D3 subjected to image processing is output from the input and output interface 32 to one or both of the computer 60 and the server 80.

Hereinafter, the processes from steps S13 to S19 described above are repeatedly executed at a time interval A while the second imaging mode is maintained, and the combination image data D3 is repeatedly generated in the second image processing unit 35B (YES in step S20, and step S21). When the imaging mode of the imaging unit 26 is switched from the second imaging mode to the first imaging mode, the imaging process and the image processing in the second imaging mode ends (NO in step S20).

Hereinafter, similarly, the imaging process and the image processing in the first imaging mode described above, and the imaging process and the image processing in the second imaging mode described above are repeatedly executed alternately according to the switching between "daytime" and "nighttime".

[Effects of First Embodiment]

As described above, since the surveillance camera 10 of the first embodiment generates the combination image data D3 in the second imaging mode during nighttime using the background image data DB generated on the basis of the first image data D1 of the color image acquired in the first imaging mode during daytime, it is possible to color-display the background region of the second image data D2 of the monochrome image obtained in the second imaging mode in the nighttime. As a result, it is possible to easily view the near-infrared light image obtained through nighttime imaging while suppressing an increase in size, and number of components due to providing two types of imaging units as described in JP2009-010675A described above, as in the first embodiment.

Further, since the first image data D1 of the visible light image is directly used as the background image data DB of the combination image data D3, the background image data DB is not affected by the above-described chromatic aberration (lateral chromatic aberration). A load of a system of the surveillance camera 10 is reduced since complex image processing or the like is not required to generate the background image data DB.

[Entire Configuration of Surveillance Camera of Second Embodiment]

Next, the surveillance camera 90 of a second embodiment of the present invention will be described. In the surveillance camera 10 of the first embodiment, the first image data D1 of the visible light image is directly used as the background image data DB in the combination image data D3. On the other hand, the surveillance camera 90 generates the background image data DB within the combination image data D3 using the color information of the first image data D1 and the luminance information of the second image data D2.

Figure 11:
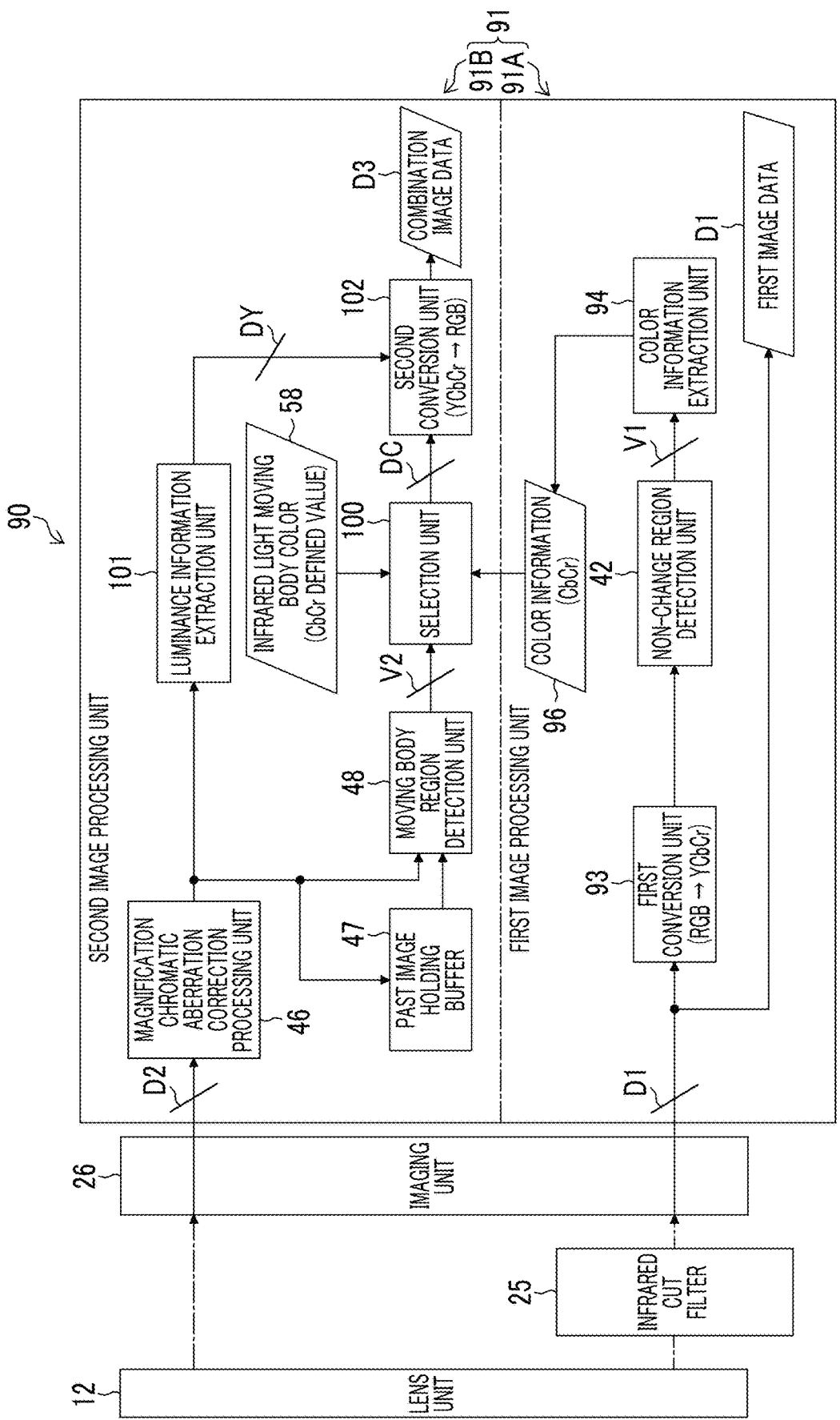
FIG. 11 is a functional block diagram of an image processing unit constituting a surveillance camera of a second embodiment.

FIG. 11 is a functional block diagram of the image processing unit 91 constituting the surveillance camera 90 of the second embodiment. As illustrated in FIG. 11, the surveillance camera 90 has basically the same configuration as the surveillance camera 10 of the first embodiment except that the surveillance camera 90 includes an image processing unit 91 different from the image processing unit 35 of the first embodiment. Thus, portions having the same function and configuration as in the first embodiment are denoted with the same reference signs and description thereof will be omitted.

The image processing unit 91 functions as a first image processing unit 91A in the first imaging mode and a second image processing unit 91B in the second imaging mode by executing the image processing program 37B read from the storage unit 36 described above. The first image processing unit 91A and the second image processing unit 91B may be integrally configured, as in the first embodiment.

[First Image Processing Unit of Second Embodiment]

The first image processing unit 91A is basically the same as the first image processing unit 35A of the first embodiment in that the first image processing unit 91A performs image processing on the first image data D1 input from the imaging unit 26 and outputs the first image data D1 after the image processing to the input and output interface 32. However, the first image processing unit 91A performs extraction of color information (CbCr) from the non-change region V1 of the first image data D1, unlike the first image processing unit 35A of the first embodiment. The first image processing unit 91A functions as a first conversion unit 93, the non-change region detection unit 42 described above, and a color information extraction unit 94.

The first conversion unit 93 converts the first image data D1 that is RGB image data input from the imaging unit 26 in the first imaging mode into YCbCr image data, and output the first image data D1 after the conversion to the non-change region detection unit 42.

The non-change region detection unit 42 detects the non-change region V1 in the plurality of pieces of first image data D1 acquired at different timings by the imaging unit 26, and outputs a detection result of the non-change region V1 to the color information extraction unit 94, as described in the first embodiment.

The color information extraction unit 94 extracts color information 96 (CbCr) from the non-change region V1 in the first image data D1 on the basis of the detection result of the non-change region V1 input from the non-change region detection unit 42 and the first image data D1 acquired by the imaging unit 26. The color information extraction unit 94 stores the color information 96 of the non-change region V1 in a memory (not illustrated) or the like. Hereinafter, the color information extraction unit 94 extracts the new color information 96 and updates the color information 96 stored in the memory with the new color information 96 each time the detection result of the non-change region V1 is input from the non-change region detection unit 42.

[Second Image Processing Unit of Second Embodiment]

The second image processing unit 91B is the same as the second image processing unit 35B of the first embodiment in that the second image processing unit 91B performs the generation of the combination image data D3. However, the second image processing unit 91B generates the background image data DB within the combination image data D3 on the basis of the luminance information extracted from the second image data D2 and the color information 96 obtained by the immediately previous first imaging mode. The second image processing unit 91B functions as the lateral chromatic aberration correction processing unit 46, the past image holding buffer 47, and the moving body region detection unit 48 described above, a selection unit 100, a luminance information extraction unit 101, and a second conversion unit 102.

The lateral chromatic aberration correction processing unit 46 performs the lateral chromatic aberration correction process on the second image data D2 input from the imaging unit 26 at a time interval A, and outputs the second image data D2 after the lateral chromatic aberration correction process to the past image holding buffer 47, the moving body region detection unit 48, and the luminance information extraction unit 101.

The moving body region detection unit 48 detects the moving body region V2 within the new second image data D2 input from the lateral chromatic aberration correction processing unit 46 (see FIGS. 6 and 7) and outputs a detection result of the moving body region V2 to the selection unit 100, as in the first embodiment.

The selection unit 100 combines the color information 96 (CbCr) of the non-change region V1 obtained in the immediately previous first imaging mode with the color information indicating the moving body region V2 to generate the color information combination data DC (CbCr) indicating the color information of the combination image data D3 on the basis of the detection result for the moving body region V2 input from the moving body region detection unit 48.

Figure 12:
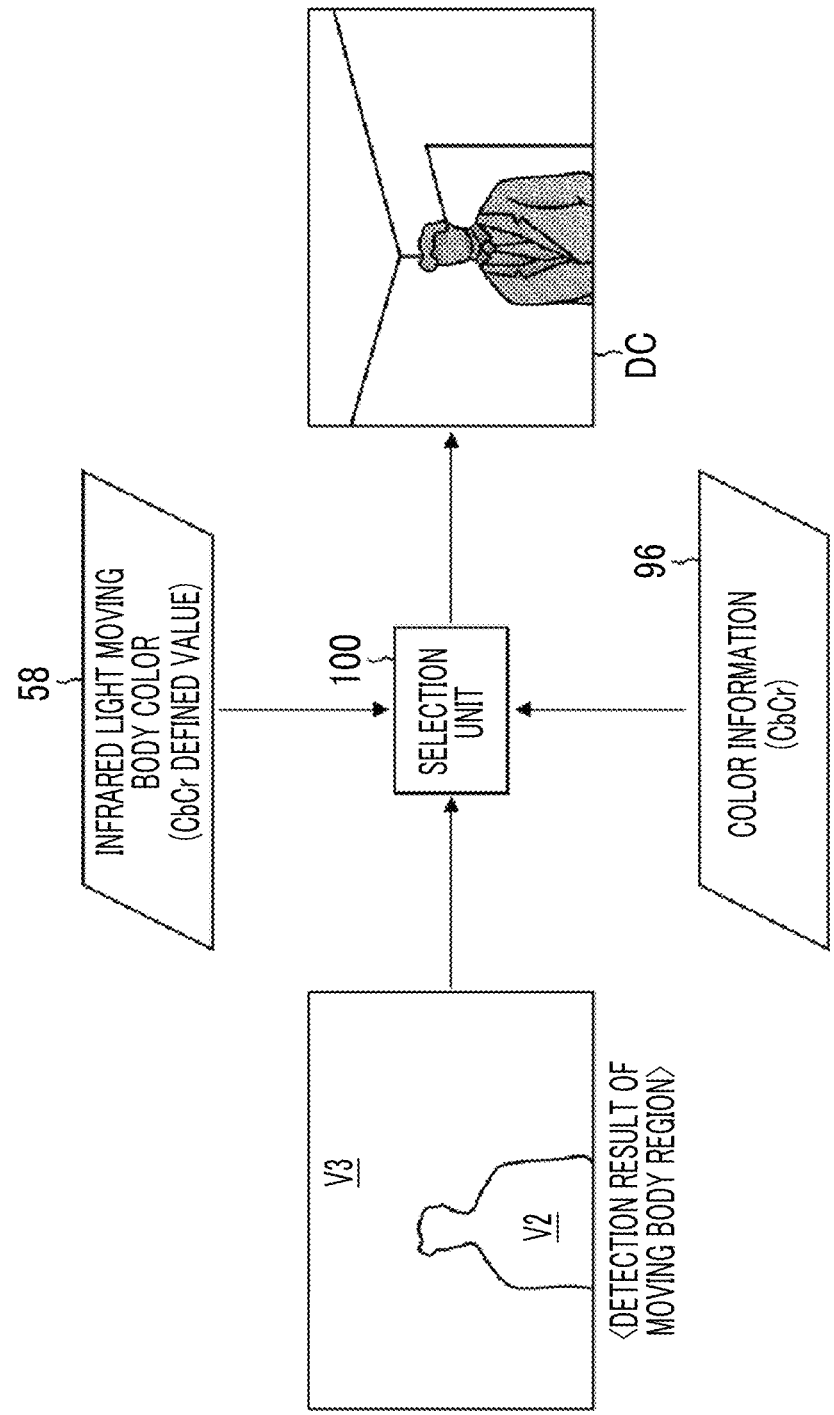
FIG. 12 is an illustrative diagram illustrating a process of generating color information combination data in a selection unit.

FIG. 12 is an illustrative diagram illustrating a process of generating the color information combination data DC in the selection unit 100. As illustrated in FIG. 12, the selection unit 100 determines which of the moving body region V2 and the background region V3 a first pixel (for example, a pixel at a lower left corner) of the color information combination data DC belongs to on the basis of the detection result of the moving body region V2 described above. In a case where the first pixel of the color information combination data DC belongs to the background region V3, the selection unit 100 selects and outputs color information (CbCr) corresponding to the first pixel (the pixel at a lower left corner) included in the color information 96 in the infrared light moving body color 58 that is color information indicating the color information 96 and the moving body region V2.

On the other hand, in a case where the first pixel of the color information combination data DC belongs to the moving body region V2, the selection unit 100 selects and outputs the color information (CbCr defined value) of the infrared light moving body color 58 among the color information 96 and the infrared light moving body color 58.

Hereinafter, similarly, for the N-th pixel of the rest of the color information combination data DC, the selection unit 100 outputs color information selected from one of the color information 96 and the infrared light moving body color 58 on the basis of the detection result of the moving body region V2. Thus, the color information 96 is selected as the color information of the pixel belonging to the background region V3 among the respective pixels of the color information combination data DC, and color information of the infrared light moving body color 58 is selected as the color information of the pixel belonging to the moving body region V2. As a result, the color information combination data DC obtained by combining the color information 96 of the above-described non-change region V1 corresponding to the background region V3 with the color information of the infrared light moving body color 58 that is color information indicating the moving body region V2 is generated. The selection unit 100 outputs the color information combination data DC to the second conversion unit 102.

Referring back to FIG. 11, the luminance information extraction unit 101 extracts luminance information for each pixel from the new second image data D2 input from the lateral chromatic aberration correction processing unit 46 and outputs luminance information data DY that is an extraction result to the second conversion unit 102. The luminance information data DY is real-time luminance information acquired through the imaging in the second imaging mode.

The second conversion unit 102 constitutes a combination image data generation unit (combination image data generation means) of the present invention together with the color information extraction unit 94 and the selection unit 100 described above. The second conversion unit 102 generates combination image data D3 that is RGB image data on the basis of the color information combination data DC input from the selection unit 100 and the luminance information data DY input from the luminance information extraction unit 101.

First, the second conversion unit 102 generates the combination image data D3 that is YCbCr image data on the basis of the color information combination data DC (CbCr) indicating color information of the combination image data D3, and the real-time luminance information data DY. That is, the second conversion unit 102 interpolates the luminance information of the color information combination data DC including only the color information with the luminance information data DY obtained in real time to generate the combination image data D3 (YCbCr image data) including the luminance information and the color information for each pixel.

Thus, in the second embodiment, the background image data DB within the combination image data D3 is generated on the basis of the color information 96 obtained in the immediately previous first imaging mode and the luminance information data DY in the background region V3 of the second image data D2. Further, in the second embodiment, the moving body image data DM within the combination image data D3 is generated on the basis of the color information of the infrared light moving body color 58, the luminance information data DY in the moving body region V2 of the second image data D2. Thus, the combination image data D3 (YCbCr image data) is generated.

Then, the second conversion unit 102 converts the combination image data D3 that is the YCbCr image data into RGB image data. The combination image data D3 that is RGB image data is subjected to the image processing such as white balance correction or gradation correction by the image processing circuit (not illustrated), and is output from the second image processing unit 35B to the input and output interface 32, as in the first embodiment.

[Operation of Surveillance Camera of Second Embodiment]

Figure 13:
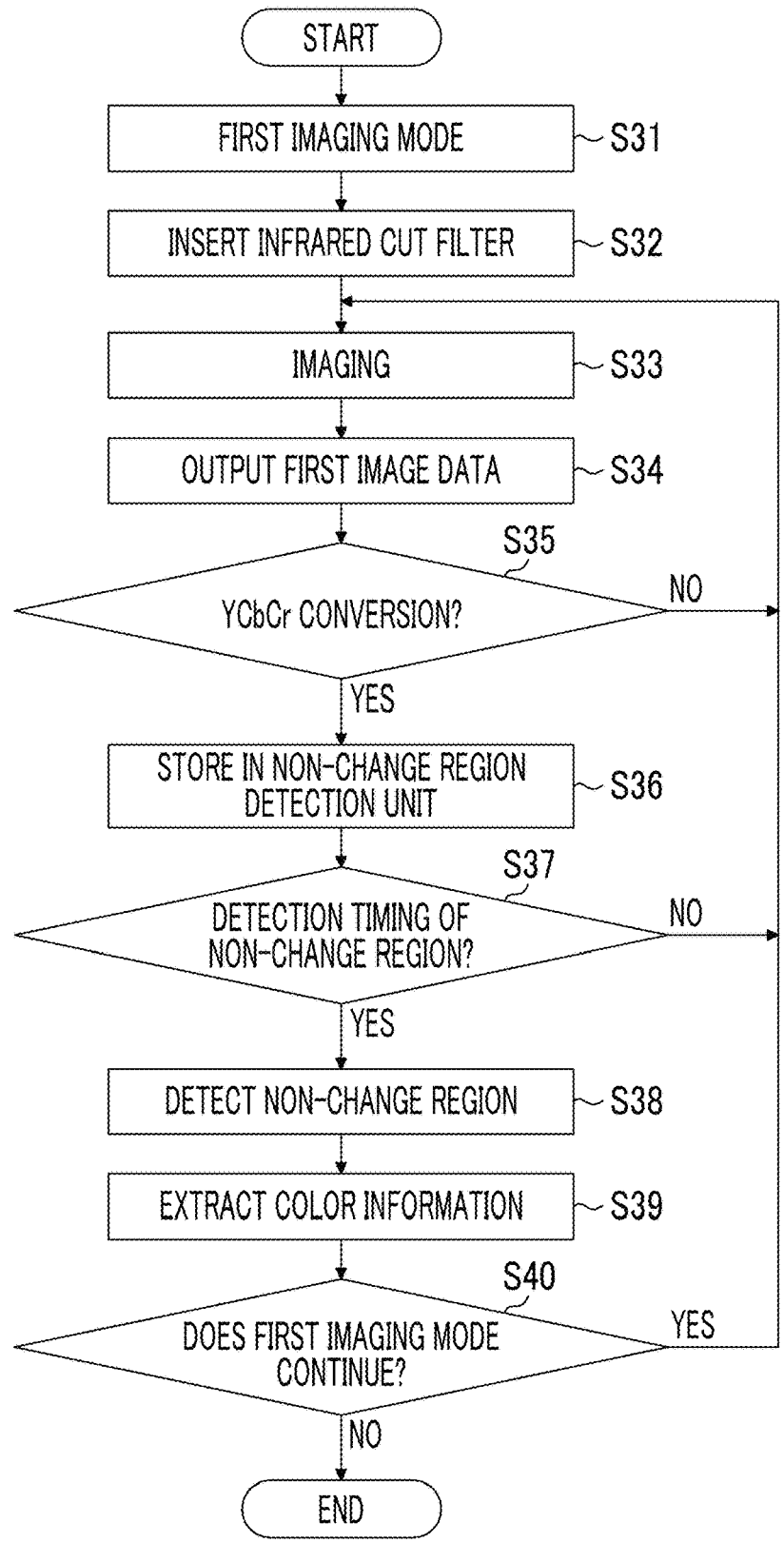
FIG. 13 is a flowchart illustrating a flow of an imaging process and image processing of the surveillance camera of the second embodiment in the first imaging mode.
Figure 14:
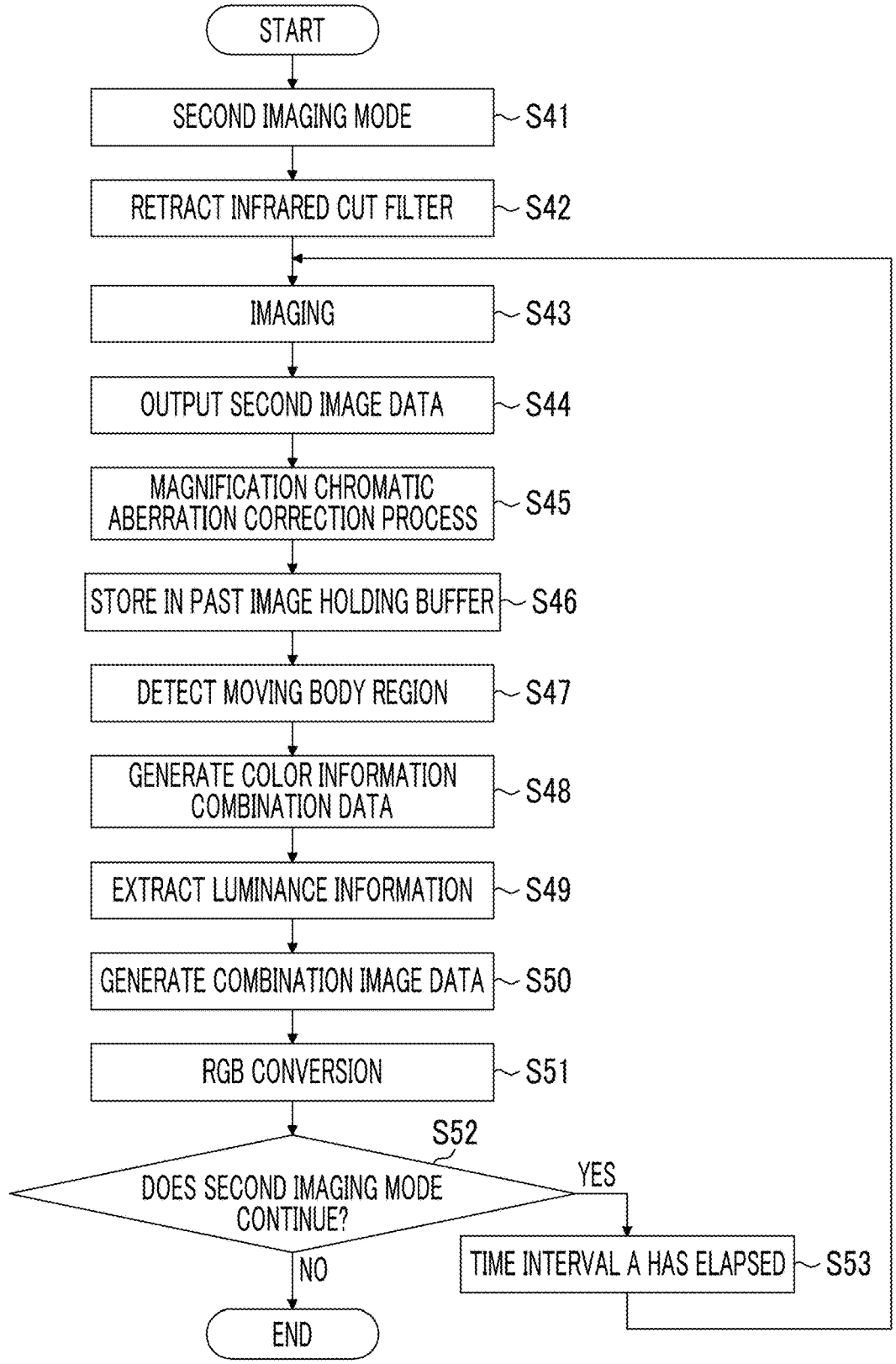
FIG. 14 is a flowchart illustrating a flow of an imaging process and image processing of the surveillance camera of the second embodiment in the second imaging mode.

Next, an operation of the surveillance camera 90 having the above configuration and, particularly, an imaging process and image processing (image processing of the imaging device of the present invention) will be described with reference to FIGS. 13 and 14. Here, FIG. 13 is a flowchart illustrating a flow of an imaging process and image processing of the surveillance camera 90 in the first imaging mode. Further, FIG. 14 is a flowchart illustrating a flow of an imaging process and image processing of the surveillance camera 90 in the second imaging mode.

<First Imaging Mode>

As illustrated in FIG. 13, since a flow of processes from step S31 to step S34 is basically the same as in the first embodiment (from step S1 to step S4) illustrated in FIG. 9, detailed description thereof will be omitted. Through the process up to step S34, the imaging unit 26 outputs the first image data D1 to the image processing unit 35. The first image data D1 output from the imaging unit 26 is input to the first image processing unit 35A of the image processing unit 35, subjected to image processing such as white balance correction or gradation correction by an image processing circuit (not illustrated), and output to the input and output interface 32.

In this case, the first image data D1 input from the imaging unit 26 is converted from RGB image data into YCbCr image data by the first conversion unit 93 at each predetermined storage timing, and then, is stored in the buffer of the non-change region detection unit 42 (YES in step S35, and step S36). The imaging of the imaging unit 26 is continuously performed until the detection timing for the non-change region V1 of the non-change region detection unit 42 (NO in step S35 or step S37). Thus, a plurality of pieces of first image data D1 (YCbCr image data) acquired at different timings are stored in the buffer of the non-change region detection unit 42.

When the detection timing of the non-change region V1 is reached, the non-change region detection unit 42 analyzes the plurality of pieces of first image data D1 in the buffer to detect the non-change region V1 on the basis of the method described in FIGS. 6 and 7 described above (YES in step S37, and step S38). The non-change region detection unit 42 outputs the detection result of the non-change region V1 to the color information extraction unit 94.

The color information extraction unit 94 extracts color information 96 (CbCr) from the non-change region V1 within the first image data D1 input from the imaging unit 26 on the basis of the detection result of the non-change region V1 input from the non-change region detection unit 42 (step S39). This color information 96 is stored in a memory (not illustrated) or the like by the color information extraction unit 94.

Hereinafter, the processes from step S33 to step S39 described above are repeatedly executed while the first imaging mode is maintained (YES in step S40). Thus, the storage of the first image data D1 in the buffer of the non-change region detection unit 42, the detection of the non-change region V1 in the non-change region detection unit 42, and the extraction of the color information 96 in the color information extraction unit 94 are repeatedly executed, and the color information 96 stored in the memory or the like described above are updated. As described below, when the imaging mode of the imaging unit 26 is switched from the first imaging mode to the second imaging mode, the imaging process and the image processing in the first imaging mode end (NO in step S40).

<Second Imaging Mode>

As illustrated in FIG. 14, since a flow of processes from steps S41 to S47 is basically the same as in the first embodiment (from step S11 to step S17) illustrated in FIG. 10, detailed description thereof will be omitted. Through the process up to step S47, new second image data D2 after the lateral chromatic aberration correction process in the lateral chromatic aberration correction processing unit 46 is output to the past image holding buffer 47, the moving body region detection unit 48, and the luminance information extraction unit 101, detection of the moving body region V2 within the new second image data D2 in the moving body region detection unit 48 is executed (corresponding to a change region detection step of the present invention), and a detection result of the moving body region V2 is output from the moving body region detection unit 48 to the selection unit 100.

The selection unit 100 reads the color information 96 (CbCr) of the non-change region V1 extracted by the color information extraction unit 94 in the immediately previous first imaging mode, from the memory, and the like described at the time of switching to the second imaging mode. Then, the selection unit 100 combines the color information 96 (CbCr) of the non-change region V1 with the color information of the infrared light moving body color 58 indicating the moving body region V2 on the basis of the detection result of the moving body region V2 input from the moving body region detection unit 48, as described with reference to FIG. 12 described above. Thus, the color information combination data DC (CbCr) is generated (step S48). The selection unit 100 outputs the color information combination data DC to the second conversion unit 102.

On the other hand, the luminance information extraction unit 101 extracts luminance information for each pixel from the new second image data D2 input from the lateral chromatic aberration correction processing unit 46, and outputs the luminance information data DY to the second conversion unit 102 (step S49).

The second conversion unit 102 generates the combination image data D3 that is the YCbCr image data on the basis of the color information combination data DC indicating the color information of the combination image data D3, and the real-time luminance information data DY. Then, the second conversion unit 102 converts the combination image data D3 that is the YCbCr image data into RGB image data. Thus, the combination image data D3 that is RGB image data is generated (steps S50 and S51, corresponding to a combination image data generation step of the present invention). This combination image data D3 is subjected to image processing such as white balance correction or gradation correction by an image processing circuit (not illustrated) and output from the second image processing unit 35B to the input and output interface 32, as in the first embodiment.

Hereinafter, the processes from steps S43 to S51 described above are repeatedly executed at a time interval A while the second imaging mode is maintained, and the combination image data D3 is repeatedly generated in the second image processing unit 91B (YES in step S52, and step S53). When the imaging mode of the imaging unit 26 is switched to the first imaging mode, the imaging process and the image processing in the second imaging mode ends (NO in step S52).

Hereinafter, similarly, the imaging process and the image processing in the first imaging mode described above, and the imaging process and the image processing in the second imaging mode described above are repeatedly executed alternately according to the switching between "daytime" and "nighttime".

[Effects of Second Embodiment]

As described above, since the surveillance camera 90 of the second embodiment generates the combination image data D3 obtained by combining the background image data DB generated on the basis of the luminance information data DY extracted from the second image data D2 and the color information 96 obtained in the first imaging mode with the moving body image data DM described above, it is possible to color-display the background region of the second image data D2 of the monochrome image obtained in the second imaging mode in the nighttime, as in the first embodiment. As a result, it is possible to easily view the near-infrared light image obtained through nighttime imaging while suppressing an increase in size, and number of components, as in the first embodiment.

Further, since the background image data DB within the combination image data D3 is generated on the basis of the color information 96 obtained in the first imaging mode and the luminance information in the real-time background region V3 acquired through the imaging in the second imaging mode, it is possible to reproduce actual light and darkness. For example, since it is possible to reproduce a change in brightness from daytime to nighttime and a state of being illuminated by the near-infrared light (auxiliary light) from the near-infrared light emitting unit 15, a realistic image (combination image data D3) is obtained.

[Surveillance Camera of Third Embodiment]

Figure 15:
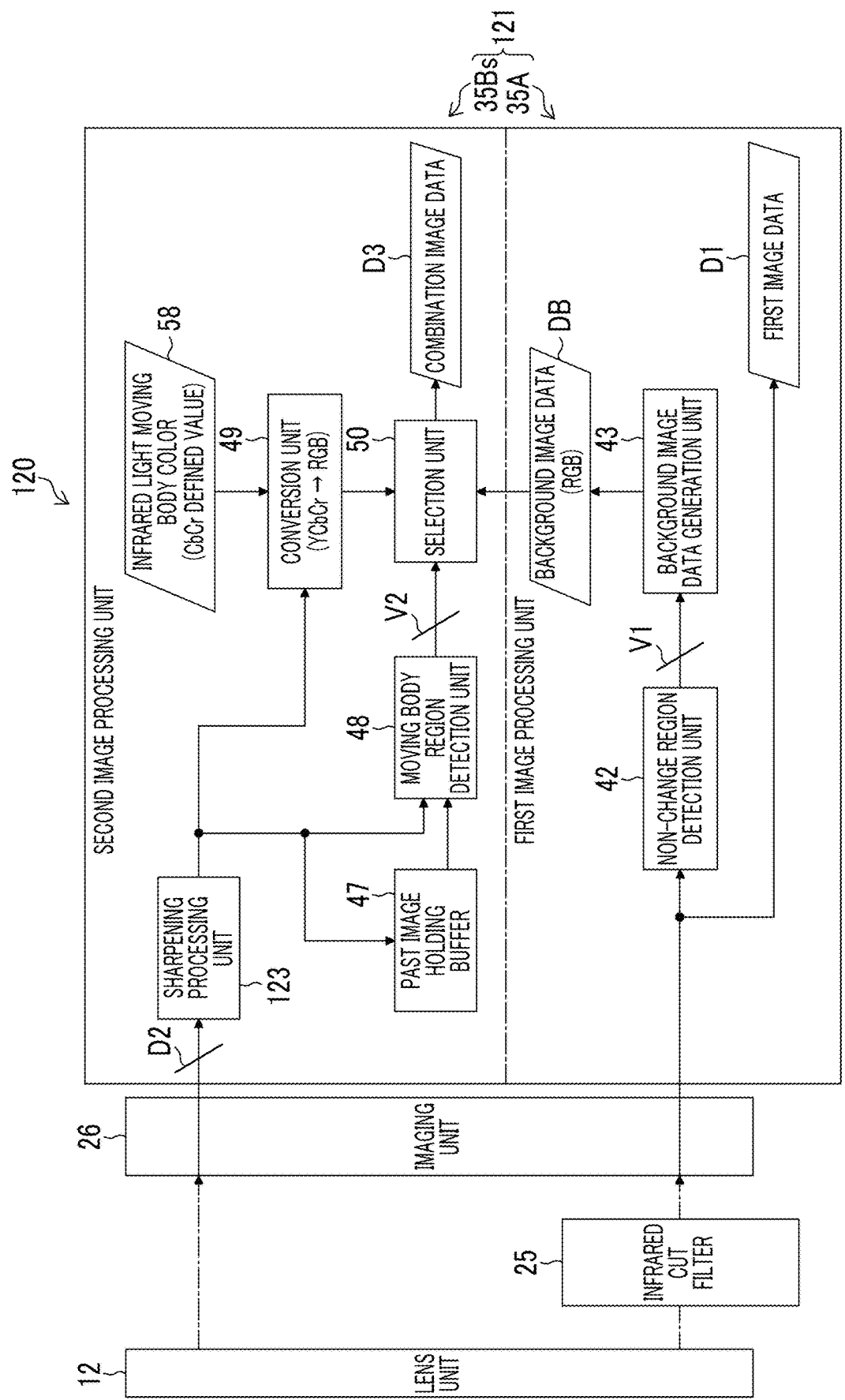
FIG. 15 is a functional block diagram of an image processing unit constituting a surveillance camera of a third embodiment.

FIG. 15 is a functional block diagram of an image processing unit 121 constituting a surveillance camera 120 of a third embodiment of the present invention. In the first embodiment, the lateral chromatic aberration correction process is performed on the second image data D2 in order to correct the chromatic aberration (lateral chromatic aberration) of the visible light and the near-infrared light, whereas the surveillance camera 120 corrects the chromatic aberration described above by performing a sharpening process on second image data D2.

As illustrated in FIG. 15, the image processing unit 121 of the surveillance camera 120 has basically the same configuration as the surveillance camera 10 in the first embodiment except that the second image processing unit 35Bs includes a sharpening processing unit 123 in place of the lateral chromatic aberration correction processing unit 46. Thus, portions having the same function and configuration as in the first embodiment are denoted with the same reference signs and description thereof will be omitted.

The sharpening processing unit 123 performs a sharpening process on the second image data D2 input at the time interval A from the imaging unit 26 (see FIG. 4) in the second imaging mode. The sharpening process is, for example, a process of performing edge emphasis of an image on the basis of the second image data D2 by performing filter processing (convolution calculation) using a sharpening filter such as a Laplacian filter.

Here, in the filter processing, by appropriately adjusting a filter coefficient of the sharpening filter, a phase of the second image data D2 can be shifted. That is, even in a case where the sharpening process is performed, it is possible to shift a pixel position of each pixel of the second image data D2 and to correct chromatic aberration (lateral chromatic aberration) of the visible light and the near-infrared light, similar to the case in which the lateral chromatic aberration correction process is performed. For the filter coefficient of the sharpening filter used in sharpening process of the sharpening processing unit 123, a filter coefficient that is determined in advance according to a type of optical system (such as a lens 16, an aperture 17, and an infrared ray cut filter 25) of the surveillance camera 120 is used.

The sharpening processing unit 123 outputs the second image data D2 after the sharpening process to a past image holding buffer 47, a moving body region detection unit 48, and a conversion unit 49. Since subsequent processes are basically the same as in the first embodiment, description thereof will be omitted.

Although the sharpening processing unit 123 of the third embodiment performs the sharpening process on the entire second image data D2, for example, detection of a moving body region V2 in the moving body region detection unit 48 may be first performed before the sharpening process, and the sharpening process may be performed on the moving body region V2 within the second image data D2 on the basis of the detection result. That is, the sharpening processing unit 123 may perform the sharpening process on at least the second moving body region V2 within the image data D2.

Further, although the embodiment in which the lateral chromatic aberration correction processing unit 46 of the surveillance camera 10 of the first embodiment is replaced with the sharpening processing unit 123 has been described in the third embodiment, the lateral chromatic aberration correction processing unit 46 of the surveillance camera 90 of the second embodiment may be replaced with the sharpening processing unit 123.

[Surveillance Camera of Fourth Embodiment]

Figure 16:
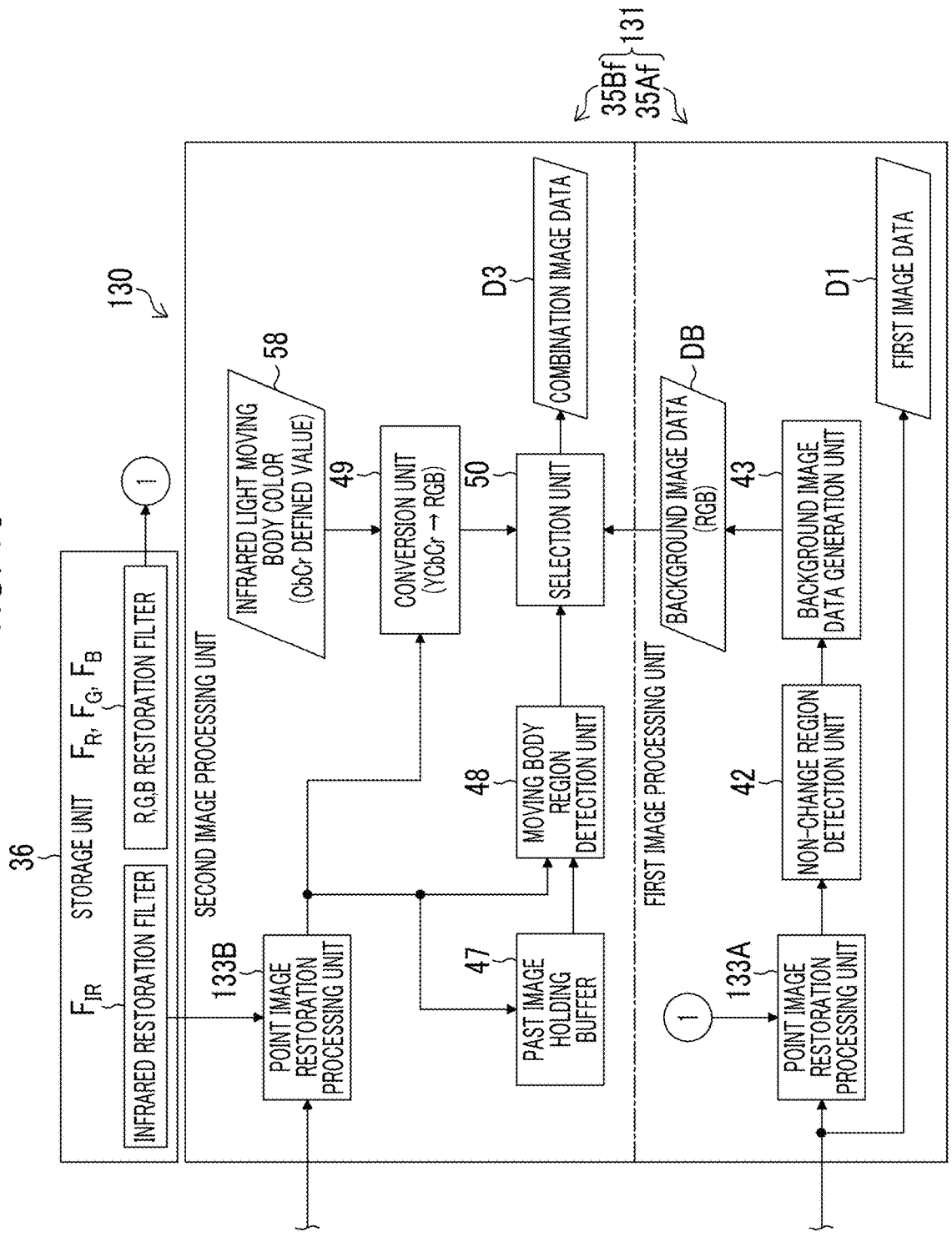
FIG. 16 is a functional block diagram of an image processing unit constituting a surveillance camera of a fourth embodiment.

FIG. 16 is a functional block diagram of an image processing unit 131 constituting a surveillance camera 130 of a fourth embodiment of the present invention. In the first embodiment, the lateral chromatic aberration correction process is performed on the second image data D2 in order to correct the chromatic aberration (lateral chromatic aberration) of the visible light and the near-infrared light. On the other hand, the surveillance camera 130 corrects the above-described chromatic aberration (lateral chromatic aberration) by performing a point image restoration process on the first image data D1 and the second image data D2.

The point image restoration process is a process of obtaining optical characteristics indicating degradation due to aberration or the like of an optical system of the surveillance camera 130 in advance, and restoring a captured image (degraded image) to a high resolution image by performing a restoration process on the captured image using a restoration (recovery) filter generated on the basis of the above-described optical characteristics.

As illustrated in FIG. 16, the image processing unit 131 of the surveillance camera 130 functions as a first image processing unit 35Af in the first imaging mode and a second image processing unit 35Bf in the second imaging mode.

Here, the first image processing unit 35Af has basically the same configuration as the first image processing unit 35A of the first embodiment except that the first image processing unit 35Af includes a point image restoration processing unit 133A corresponding to a second point image restoration processing unit of the present invention. Further, the second image processing unit 35Bs has basically the same configuration as the second image processing unit 35B of the first embodiment except that the second image processing unit 35Bs includes a point image restoration processing unit 133B corresponding to a first point image restoration processing unit of the present invention in place of the lateral chromatic aberration correction processing unit 46. Thus, portions having the same function and configuration as in the first embodiment are denoted with the same reference signs and description thereof will be omitted.

The point image restoration processing unit 133A performs a point image restoration process on the first image data D1 input from the imaging unit 26 in the first imaging mode using three restoration filters $F_R$, $F_G$, and $F_B$ for R, G and B to be described below stored in the storage unit 36 described above. Further, the point image restoration processing unit 133B performs a point image restoration process on the second image data D2 input from the imaging unit 26 in the second imaging mode using an infrared restoration filter $F_{IR}$ to be described below stored in the storage unit 36.

<Point Image Restoration Process in First Imaging Mode>

Figure 17:
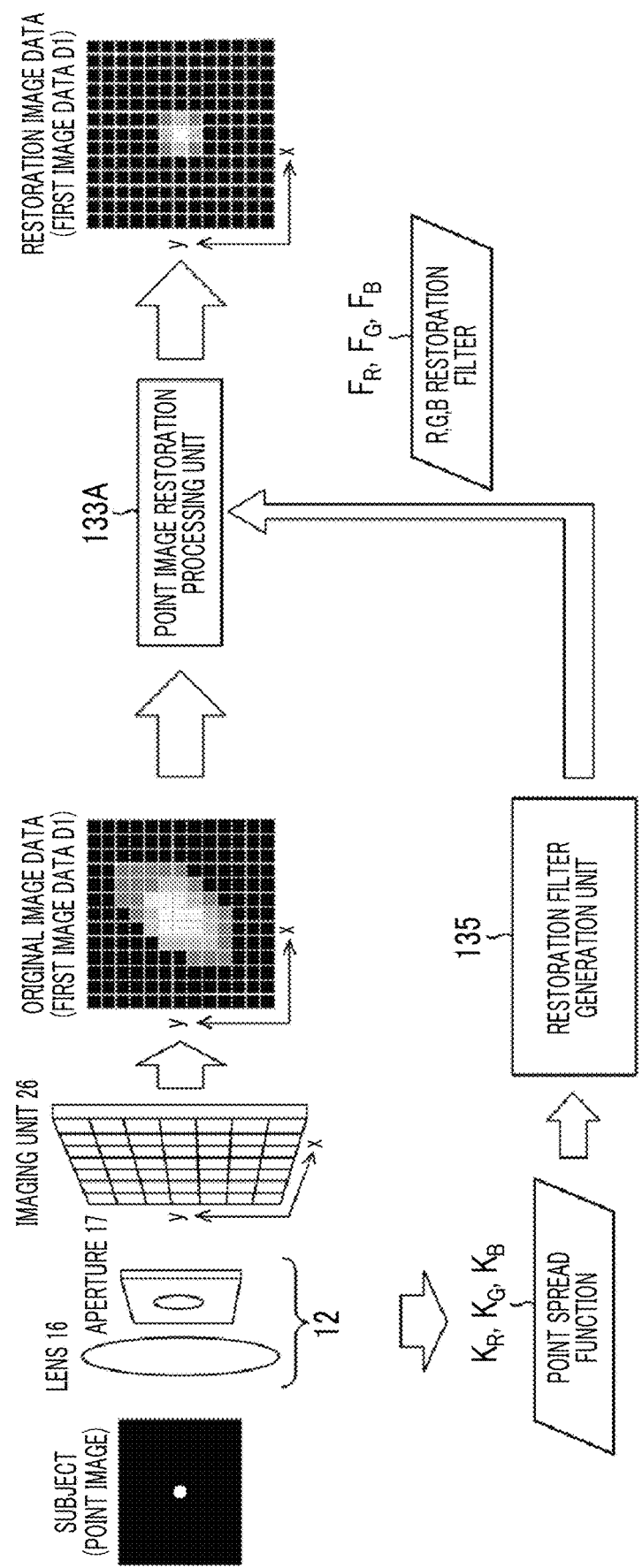
FIG. 17 is an illustrative diagram illustrating a point image restoration process in a point image restoration processing unit in a first imaging mode.

FIG. 17 is an illustrative diagram illustrating a point image restoration process of the point image restoration processing unit 133A in the first imaging mode. FIG. 17 illustrates a case where a point image as a subject is imaged for ease of understanding (as in FIG. 19 to be described below).

As illustrated in FIG. 17, when a point image as a subject is imaged in the first imaging mode, a visible light image of the subject is captured by the imaging unit 26 through an optical system (such as the lens 16, the aperture 17, and the infrared ray cut filter 25) of the surveillance camera 130, and first image data D1 is output from the imaging unit 26. In the first image data D1, an amplitude component and a phase component are degraded due to a point spread phenomenon based on optical characteristics of the optical system of the surveillance camera 130 with respect to visible light, and an original subject image (point image) becomes a non-point-symmetrical blurred image. Here, since the visible light includes light in various wavelength bands, lateral chromatic aberration occurs, and shift of phases of R image data, G image data, and B image data constituting the first image data D1 occurs. Hereinafter, the R image data, the G image data, and the B image data are simply referred to as "R, G, B image data."

In the point image restoration process of the point image restoration processing unit 133A, point spread functions (PSF) $K_R$, $K_G$, and $K_B$ for each color with respect to R light, G light, and B light are obtained in advance as optical characteristics of the optical system of the surveillance camera 130 with respect to the visible light (corresponding to second optical characteristic of the present invention). The point spread functions $K_R$, $K_G$, and $K_B$ correspond to a second point spread function of the present invention.

An optical transfer function (OTF) may be obtained in advance in place of the point spread functions $K_R$, $K_G$, and $K_B$ (PSF). The PSF and the OTF are in a Fourier transformation relationship, the PSF is a real function, and the OTF is a complex function. Further, functions having information equivalent to the PSF and the OTF include a modulation transfer function (MTF) or an amplitude transfer function, and a phase transfer function (PTF), which indicate an amplitude component and a phase component of the OTF, respectively. A combination of the MTF with the PTF provides the amount of information equivalent to the OTF or the PSF.

In this embodiment, the point spread functions $K_R$, $K_G$, and $K_B$ (PSF) are obtained in advance and input to the restoration filter generation unit 135. For the restoration filter generation unit 135, for example, a calculation device such as a computer may be used. The restoration filter generation unit 135 generates restoration filters $F_R$, $F_G$, and $F_B$ for R, G, and B that are used in the point image restoration process of the point image restoration processing unit 133A on the basis of the point spread functions $K_R$, $K_G$, and $K_B$ (PSF).

In general, it is possible to use a convolution type of Wiener filter as the restoration filter that is used to restore the blurred image using the PSF. Frequency characteristics $d(\omega_x, \omega_y)$ of the restoration filter can be calculated using the following formula by referring to information on the OTF obtained by performing Fourier transform on PSF(x, y) and a signal-noise ratio (SNR; also referred to as an SN ratio).

$$d(\omega_x, \omega_y) = \frac{H^*(\omega_x, \omega_y)}{\|H(\omega_x, \omega_y)\|^2 + 1/SNR(\omega_x, \omega_y)}$$

Here, $H(\omega_x, \omega_y)$ represents the OTF, and $H^*(\omega_x, \omega_y)$ represents a complex conjugate. Further, $SNR(\omega_x, \omega_y)$ represents the signal-to-noise ratio (SN ratio).

A design of filter coefficients of the restoration filter is an optimization issue of selecting coefficient values such that frequency characteristics of the filter are closest to desired Wiener frequency characteristics, and the filter coefficients are appropriately calculated using an arbitrary known scheme.

Thus, the restoration filters $F_R$, $F_G$, and $F_B$ for R, G, and B are obtained using a predetermined amplitude restoration and phase correction filter calculation algorithm from point image information (PSF) of the optical system of the surveillance camera 130 according to imaging conditions at the time of acquisition of the first image data D1. The point image information of the optical system may vary with various imaging conditions, such as an aperture value, a focal length, a zoom amount, an image height, the number of recording pixels, and a pixel pitch, as well as the type of lens 16. Thus, when the restoration filters $F_R$, $F_G$, and $F_B$ for R, G, and B are generated (calculated) by the restoration filter generation unit 135, the imaging conditions is acquired. The restoration filter generation unit 135 stores the generated restoration filters $F_R$, $F_G$, and $F_B$ for R, G, and B in the storage unit 36 described above.

The restoration filters $F_R$, $F_G$, and $F_B$ for R, G, and B are, for example, filters in a real space constituted by α×β taps (α and β are integers equal to or greater than 2), and are applied to RGB image data of the first image data D1 that is a processing target. Thus, by performing weighted averaging calculation (deconvolution calculation) on the filter coefficient assigned to each tap and corresponding pixel data (processing target pixel data and neighboring pixel data of the RGB image data), it is possible to calculate the pixel data after a recovery process. By applying a weighted averaging process using the restoration filters $F_R$, $F_G$, and $F_B$ for R, G, and B to all of pieces of pixel data constituting R, G, and B image data while changing target pixels in order, it is possible to perform the point image restoration process.

FIG. 18 is an illustrative diagram illustrating phase correction and amplitude correction of the point image restoration process. As illustrated in FIG. 18, the point image restoration process can be greatly classified into "phase correction" (also referred to as "phase restoration") and "amplitude correction" (also referred to as "amplitude restoration"). The "phase correction" is a process of restoring the phase component of RGB image data of the first image data D1 using the restoration filters $F_R$, $F_G$, and $F_B$ for R, G, and B. Specifically, the "phase correction" includes restoration of phase shift of the RGB image data, and restoration of the phase component due to the shape of the non-point-symmetric point spread functions $K_R$, $K_G$, and $K_B$ (PSF). The restoration of the phase component due to the shape of the non-point-symmetric point spread function is to correct the non-point-symmetric point spread shape into a point-symmetric point spread shape.

The "amplitude correction" is a process of restoring the amplitude component (MTF) of the first image data D1. Through the amplitude correction, it is possible to correct the point spread shape into a point (delta function).

Referring back to FIG. 17, the point image restoration processing unit 133A performs the point image restoration process using the restoration filters $F_R$, $F_G$, and $F_B$ for R, G, and B for amplitude restoration and phase correction on the R, G, and B image data of the original image data (the first image data D1) input from the imaging unit 26. Thus, the recovered image data (the first image data D1) indicating an image (recovered image) closer to an original subject image (point image) is obtained.

<Point Image Restoration Process in Second Imaging Mode>

Figure 19:
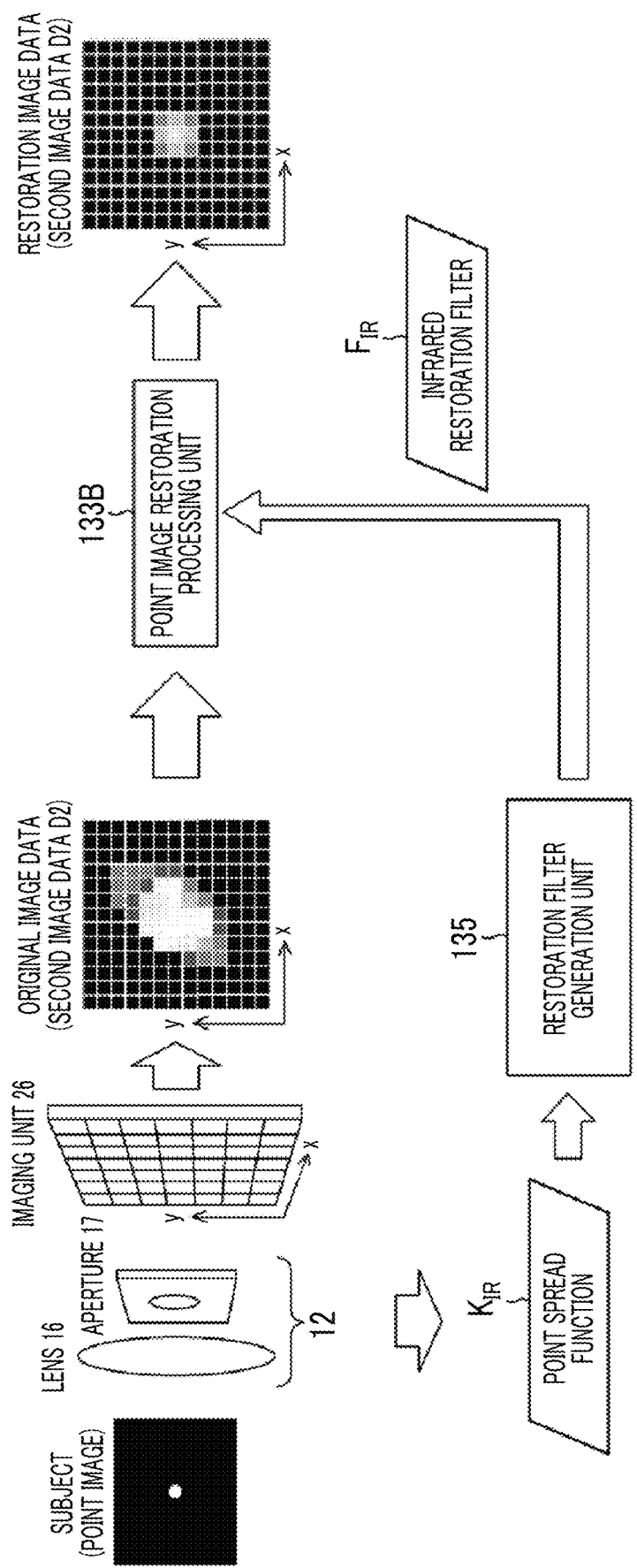
FIG. 19 is an illustrative diagram illustrating a point image restoration process in a point image restoration processing unit in a second imaging mode.

FIG. 19 is an illustrative diagram illustrating a point image restoration process in the point image restoration processing unit 133B in the second imaging mode. As illustrated in FIG. 19, when imaging of a point image as a subject is performed in the second imaging mode, a near-infrared light image of the subject is captured by the imaging unit 26 through the optical system (such as the lens 16 and the aperture 17) of the surveillance camera 130, and the second image data D2 is output from the imaging unit 26. In the second image data D2, an amplitude component and a phase component are degraded due to a point spread phenomenon based on optical characteristics of the optical system of the surveillance camera 130 with respect to the near-infrared light, and an original subject image (point image) becomes a non-point-symmetric blurred image.

In the point image restoration process of the point image restoration processing unit 133B, a point spread function (PSF) $K_{IR}$ with respect to the near-infrared light is obtained in advance as optical characteristics (corresponding to first optical characteristic of the present invention) of the optical system of the surveillance camera 130 with respect to near-infrared light. This point spread function $K_{IR}$ corresponds to a first point spread function of the present invention.

In this embodiment, a point spread function $K_{IR}$ (PSF) corresponding to the near-infrared light is obtained in advance and input to the restoration filter generation unit 135 described above. The restoration filter generation unit 135 generates an infrared restoration filter $F_{IR}$ that is used in the point image restoration process of the point image restoration processing unit 133B on the basis of the point spread function $K_{IR}$ (PSF) corresponding to the near-infrared light. The infrared restoration filter $F_{IR}$ is obtained using a predetermined amplitude restoration and phase correction filter calculation algorithm from the point spread information (PSF) of the optical system of the surveillance camera 130 according to the imaging conditions at the time of acquisition of the second image data D2. The restoration filter generation unit 135 stores the generated infrared restoration filter $F_{IR}$ in the storage unit 36 described above.

The point image restoration processing unit 133B performs the point image restoration process using the infrared restoration filter $F_{IR}$ for amplitude restoration and phase correction on the original image data (the second image data D2) input from the imaging unit 26. Here, since an influence of light other than the near-infrared light can be substantially ignored at the time of capturing the near-infrared light image during nighttime, the lateral chromatic aberration does not occur. Therefore, restoration (amplitude correction) of the amplitude component of the second image data D2 and restoration (phase correction) of the phase component due to a shape of the non-point-symmetric point spread function $K_{IR}$ are performed in the point image restoration process of the point image restoration processing unit 133B. Thus, recovered image data (the second image data D2) indicating an image (recovered image) closer to the original subject image (point image) is obtained.

<Effects of Fourth Embodiment>

As described above, in the surveillance camera 130 of the fourth embodiment, since the restoration of the amplitude component and the restoration of the phase component in the first image data D1 and the second image data D2 are performed through the point image restoration process in the point image restoration processing unit 133A and the point image restoration processing unit 133B, the same effects as in the case where the lateral chromatic aberration correction process described above has been performed can be obtained and the chromatic aberration (lateral chromatic aberration) of the visible light and the near-infrared light can be corrected.

<Other Example of Fourth Embodiment>

Although the point image restoration process is performed on both of the first image data D1 and the second image data D2 in the fourth embodiment, the point image restoration process may be performed on the second image data D2. Further, although the point image restoration process is performed on the entire second image data D2 in the fourth embodiment, for example, the detection of the moving body region V2 may be performed before the point image restoration process, and the point image restoration process may be performed on the moving body region V2 within the second image data D2 on the basis of the detection result. That is, the point image restoration processing unit 133B may perform the point image restoration process on at least the moving body region V2 within the second image data D2.

Although the embodiment in which the point image restoration process is performed in place of the lateral chromatic aberration correction process in the surveillance camera 10 of the first embodiment has been described in the fourth embodiment, the present invention can be applied to an embodiment in which the point image restoration process is performed in place of the lateral chromatic aberration correction process in the surveillance camera 90 of the second embodiment. Further, although the two point image restoration processing units 133A and 133B are provided in the fourth embodiment, the point image restoration process may be performed on the first image data D1 and the second image data D2 by one point image restoration processing unit.

[Others]

Although the surveillance camera that performs so-called fixed-point observation has been described by way of example in the above embodiment, the present invention is applicable to a surveillance camera that has a pan and tilt function and is capable of imaging a plurality of subjects (a wide range of surveillance region).

Although the first image processing unit functions as the non-change region detection unit 42 in each of the above embodiments, the non-change region detection unit 42 can be omitted. Further, although the correction of the chromatic aberration (lateral chromatic aberration) of the visible light and the near-infrared light is performed through the lateral chromatic aberration correction process, the sharpening process, or the point image restoration process in each of the above embodiments, the chromatic aberration (lateral chromatic aberration) can be suppressed to some extent as long as there are no restrictions on the number of lenses 16 or the like. Thus, in this case, the correction of the chromatic aberration (lateral chromatic aberration) may be omitted.

Although the surveillance camera has been described by way of example as an example of the imaging device of the present invention installed at a fixed position in the above embodiment, the imaging device of the present invention includes various imaging devices such as a commercially available digital camera or smartphone that images a specific subject (surveillance region) installed at a fixed position.

Although the second image data D2 is acquired by the imaging unit 26 including the imaging element having RGB pixels in the second imaging mode in the above embodiment, the second image data D2 may be acquired by an imaging unit including an imaging element having near-infrared light pixels in addition to the RGB pixels.

A program (such as the image processing program 37B described above) for causing a computer of the imaging device to function as an imaging device (surveillance camera) described in the above embodiment is recorded on CD-ROM, a magnetic disk, or another computer-readable medium (a tangible non-transitory information storage medium), and the program can be provided through the information storage medium. A program signal can also be provided as a download service using a communication network such as the Internet, instead of an aspect in which the program is stored in such an information storage medium and provided.

EXPLANATION OF REFERENCES

10: surveillance camera
12: lens unit
16: lens
25: infrared ray cut filter
26: imaging unit
35: image processing unit
37B: image processing program
42: non-change region detection unit
43: background image data generation unit
46: lateral chromatic aberration correction processing unit 48: moving body region detection unit
49: conversion unit
50: selection unit
90: surveillance camera
91: image processing unit
94: color information extraction unit
100: selection unit
120: surveillance camera
121: image processing unit
123: sharpening processing unit
130: surveillance camera
131: image processing unit
133A: point image restoration processing unit
133B: point image restoration processing unit

What is claimed is:

1. An imaging device installed at a fixed position, comprising:
an optical system in which an infrared ray cut filter is insertable into an imaging optical path or retractable from the imaging optical path;
an imaging unit including signal processing circuitry and having a first imaging mode in which the imaging unit images a subject through the optical system in which the infrared ray cut filter has been inserted into the imaging optical path to acquire first image data indicating a visible light image that is a visible light image of the subject, the visible light image being a color image, and a second imaging mode in which the imaging unit images the subject through the optical system in which the infrared ray cut filter has been retracted from the imaging optical path to acquire second image data including a near-infrared light image that is a near-infrared light image of the subject, the near-infrared light image being a monochrome image; and
processing circuitry configured to:
alternately switch between the first imaging mode and the second imaging mode;
detect a change region having a change within the second image data acquired by the imaging unit when compared with the second image data that the imaging unit has acquired prior to the second image data in a case where the imaging unit is operating in the second imaging mode;
generate combination image data obtained by combining the change region image data corresponding to the change region within the second image data with background image data of the color image generated on the basis of the first image data acquired in the first imaging mode immediately before the second imaging mode by the imaging unit and corresponding to a background region different from the change region within the second image data on the basis of the detection result; and
perform a point image restoration process based on first optical characteristics of the optical system with respect to near-infrared light on at least the change region image data,
wherein the processing circuitry is further configured to generate the background image data on the basis of color information extracted from a region corresponding to the background region within the first image data, and the luminance information in the background region of the second image data,
wherein the first optical characteristics are a first point spread function of the optical system with respect to the near-infrared light; and
wherein the point image restoration process that the processing circuitry performs on the change region image data includes restoring an amplitude component of the change region image data, and a phase component due to a shape of the non-point-symmetric, first point spread function.

2. The imaging device according to claim 1, wherein the processing circuitry is further configured to generate the background image data using the image data itself included in the region corresponding to the background region within the first image data.

3. The imaging device according to claim 1, wherein the processing circuitry is further configured to detect a non-change region in the plurality of pieces of first image data that the imaging unit has acquired at different timings in the first imaging mode, and
generate the background image data from the image data corresponding to the non-change region within the first image data on the basis of a detection result.

4. The imaging device according to claim 2, wherein the processing circuitry is further configured to detect a non-change region in the plurality of pieces of first image data that the imaging unit has acquired at different timings in the first imaging mode, and
generate the background image data from the image data corresponding to the non-change region within the first image data on the basis of a detection result.

5. The imaging device according to claim 1, wherein the processing circuitry is further configured to perform a sharpening process on at least the change region image data.

6. The imaging device according to claim 1, wherein the processing circuitry is further configured to perform a lateral chromatic aberration correction process on at least the change region image data.

7. The imaging device according to claim 1, wherein the processing circuitry is further configured to perform a point image restoration process based on second optical characteristics of the optical system with respect to visible light on the first image data.

8. The imaging device according to claim 7, wherein:
the second optical characteristics are a second point spread function of each color of the optical system with respect to red, green, and blue visible light; and
the point image restoration process that the processing circuitry performs on the first image data includes a process of restoring a phase component of the first image data using a restoration filter based on the second point spread function for each color.

9. An image processing method for an imaging device comprising an optical system in which an infrared ray cut filter is insertable into an imaging optical path or retractable from the imaging optical path, an imaging unit including signal processing circuitry and having a first imaging mode in which the imaging unit images a subject through the optical system in which the infrared ray cut filter has been inserted into the imaging optical path to acquire first image data indicating a visible light image that is a visible light image of the subject, the visible light image being a color image, and a second imaging mode in which the imaging unit images the subject through the optical system in which the infrared ray cut filter has been retracted from the imaging optical path to acquire second image data including a near-infrared light image that is a near-infrared light image of the subject, the near-infrared light image being a monochrome image, and processing circuitry that alternately switches between the first imaging mode and the second imaging mode, the imaging device being installed at a fixed position, the method comprising:
- a change region detection step of detecting a change region having a change within the second image data acquired by the imaging unit when compared with the second image data that the imaging unit has acquired prior to the second image data in a case where the imaging unit is operating in the second imaging mode;
- a combination image data generation step of generating combination image data obtained by combining the change region image data corresponding to the change region within the second image data with background image data of the color image generated on the basis of the first image data acquired in the first imaging mode immediately before the second imaging mode by the imaging unit and corresponding to a background region different from the change region within the second image data on the basis of the detection result in the change region detection step; and
- a first point image restoration processing step of performing a point image restoration process based on first optical characteristics of the optical system with respect to near-infrared light on at least the change region image data,
- wherein the first optical characteristics are a first point spread function of the optical system with respect to the near-infrared light; and
- wherein the point image restoration process that the first point image restoration processing step performs on the change region image data includes restoring an amplitude component of the change region image data, and a phase component due to a shape of the non-point-symmetric, first point spread function.

10. A non-transitory computer-readable tangible medium containing a program, executable by processing circuitry, for causing a computer of an imaging device comprising an optical system in which an infrared ray cut filter is insertable into an imaging optical path or retractable from the imaging optical path, an imaging unit including signal processing circuitry and having a first imaging mode in which the imaging unit images a subject through the optical system in which the infrared ray cut filter has been inserted into the imaging optical path to acquire first image data indicating a visible light image that is a visible light image of the subject, the visible light image being a color image, and a second imaging mode in which the imaging unit images the subject through the optical system in which the infrared ray cut filter has been retracted from the imaging optical path to acquire second image data including a near-infrared light image that is a near-infrared light image of the subject, the near-infrared light image being a monochrome image, and the processing circuitry that alternately switches between the first imaging mode and the second imaging mode, the imaging device being installed at a fixed position, to perform a method comprising:
- detecting a change region having a change within the second image data acquired by the imaging unit when compared with the second image data that the imaging unit has acquired prior to the second image data in a case where the imaging unit is operating in the second imaging mode; and
- generating combination image data obtained by combining the change region image data corresponding to the change region within the second image data with background image data of the color image generated on the basis of the first image data acquired in the first imaging mode immediately before the second imaging mode by the imaging unit and corresponding to a background region different from the change region within the second image data on the basis of the detection result; and
- performing a point image restoration process based on first optical characteristics of the optical system with respect to near-infrared light on at least the change region image data,
- wherein the first optical characteristics are a first point spread function of the optical system with respect to the near-infrared light; and
- wherein the point image restoration process that is performed on the change region image data includes restoring an amplitude component of the change region image data, and a phase component due to a shape of the non-point-symmetric, first point spread function.

* * * * *